(12) United States Patent
Zhang et al.

(10) Patent No.: US 12,175,431 B2
(45) Date of Patent: Dec. 24, 2024

(54) FACILITATING COLLABORATION IN A WORK ENVIRONMENT

(71) Applicant: Lemon Inc., Grand Cayman (KY)

(72) Inventors: Yuhui Zhang, Los Angeles, CA (US); Jiamin Chen, Los Angeles, CA (US); Hongjie Dong, Los Angeles, CA (US); Ruchir Astavans, Los Angeles, CA (US); Tianzi Yuan, Los Angeles, CA (US); Minghan Jiang, Los Angeles, CA (US); Jianqiu Yang, Los Angeles, CA (US); Justin Moonsoo Kang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/859,988

(22) Filed: Jul. 7, 2022

(65) Prior Publication Data

US 2023/0153758 A1    May 18, 2023

Related U.S. Application Data

(63) Continuation-in-part of application No. 17/527,078, filed on Nov. 15, 2021, now Pat. No. 11,677,908.

(51) Int. Cl.
*G06Q 10/10* (2023.01)
*H04L 12/18* (2006.01)

(52) U.S. Cl.
CPC ....... *G06Q 10/103* (2013.01); *H04L 12/1822* (2013.01)

(58) Field of Classification Search
None
See application file for complete search history.

(56) References Cited

U.S. PATENT DOCUMENTS

| | | | |
|---|---|---|---|
| 7,478,129 B1 | 1/2009 | Chemtob | |
| 8,443,041 B1 | 5/2013 | Krantz et al. | |
| 9,749,367 B1 | 8/2017 | Kirby et al. | |
| 9,882,846 B1 * | 1/2018 | Cohen | H04L 65/1069 |

(Continued)

FOREIGN PATENT DOCUMENTS

| | | |
|---|---|---|
| CN | 108520046 A | 9/2018 |
| EP | 2787718 A1 | 10/2014 |

(Continued)

OTHER PUBLICATIONS

U.S. Appl. No. 17/527,041, filed Nov. 15, 2021, Zhang.

(Continued)

*Primary Examiner* — Phyllis A Book
(74) *Attorney, Agent, or Firm* — BakerHostetler

(57) ABSTRACT

The present disclosure describes techniques for facilitating a collaborative environment. The techniques may comprise aggregating data shared by at least a subset of a plurality of users via a plurality of message threads and a plurality of virtual rooms in the collaborative environment. The data may be categorized into a plurality of categories based on determining relatedness of the data. Data associated with any category among the plurality of categories may be classified based on a plurality of types of the data associated with the category. One of the plurality of types of the data associated with the category may be displayed on a first computing device associated with a first user among the plurality of users.

19 Claims, 17 Drawing Sheets

(56) References Cited

U.S. PATENT DOCUMENTS

| | | |
|---|---|---|
| 9,955,318 B1 | 4/2018 | Scheper et al. |
| 10,157,358 B1* | 12/2018 | Brisebois ............ G06Q 10/1095 |
| 10,958,600 B1 | 3/2021 | Annadata et al. |
| 11,222,454 B1 | 1/2022 | Boissiere et al. |
| 11,323,493 B1 | 5/2022 | Xi et al. |
| 11,349,890 B2 | 5/2022 | Spencer et al. |
| 11,381,411 B1 | 7/2022 | Gale et al. |
| 11,394,924 B1 | 7/2022 | Maxim |
| 11,405,436 B1 | 8/2022 | Mindlin et al. |
| 2007/0260684 A1 | 11/2007 | Sharma et al. |
| 2009/0222742 A1* | 9/2009 | Pelton ..................... G06Q 10/10 715/753 |
| 2009/0251457 A1* | 10/2009 | Walker ..................... A63F 13/00 345/418 |
| 2009/0300516 A1 | 12/2009 | Jerrard-Dunne et al. |
| 2009/0300521 A1 | 12/2009 | Jerrard-Dunne et al. |
| 2010/0251177 A1 | 9/2010 | Geppert et al. |
| 2012/0290950 A1* | 11/2012 | Rapaport .............. H04L 67/306 715/753 |
| 2012/0290954 A1 | 11/2012 | Qureshi et al. |
| 2012/0331401 A1 | 12/2012 | Tipirneni |
| 2013/0051548 A1 | 2/2013 | Chavez |
| 2013/0212494 A1* | 8/2013 | Heiferman .............. H04L 51/00 715/753 |
| 2013/0342534 A1 | 12/2013 | Walker et al. |
| 2014/0096036 A1 | 4/2014 | Mohler |
| 2014/0096039 A1 | 4/2014 | Schultz |
| 2014/0229866 A1 | 8/2014 | Gottlieb |
| 2014/0278977 A1 | 9/2014 | Newton et al. |
| 2015/0135300 A1* | 5/2015 | Ford ....................... G06Q 50/18 726/11 |
| 2015/0149549 A1 | 5/2015 | Tsukamoto |
| 2016/0127689 A1 | 5/2016 | Huang |
| 2016/0309116 A1 | 10/2016 | Gottlieb |
| 2018/0098059 A1 | 4/2018 | Valdivia et al. |
| 2018/0294986 A1 | 10/2018 | Vidro et al. |
| 2018/0353860 A1 | 12/2018 | Nakamura et al. |
| 2019/0279522 A1* | 9/2019 | Jafari ........................ G09B 5/08 |
| 2020/0036667 A1* | 1/2020 | Talton .................. H04L 51/216 |
| 2020/0042526 A1 | 2/2020 | Yun et al. |
| 2020/0076746 A1* | 3/2020 | Penrose ................ H04L 51/046 |
| 2020/0100074 A1 | 3/2020 | Purohit et al. |
| 2020/0169559 A1 | 5/2020 | Jones et al. |
| 2020/0274885 A1 | 8/2020 | Cselle et al. |
| 2020/0294000 A1 | 9/2020 | Sexauer et al. |
| 2020/0328908 A1 | 10/2020 | Howland et al. |
| 2021/0014287 A1 | 1/2021 | Kimball et al. |
| 2021/0021649 A1 | 1/2021 | Rathod |
| 2021/0081897 A1* | 3/2021 | Culver ................. G06Q 10/103 |
| 2021/0096695 A1 | 4/2021 | Zhang et al. |
| 2021/0224765 A1* | 7/2021 | Siddique ................ G06Q 10/10 |
| 2021/0319408 A1 | 10/2021 | Jorasch et al. |
| 2021/0342785 A1* | 11/2021 | Mann ..................... G06F 40/18 |
| 2021/0352244 A1 | 11/2021 | Benedetto et al. |
| 2021/0360073 A1 | 11/2021 | Rodgers et al. |
| 2021/0373741 A1 | 12/2021 | Agarawala et al. |
| 2021/0374683 A1 | 12/2021 | Park et al. |
| 2021/0400093 A1 | 12/2021 | Ashkenazi et al. |
| 2022/0027021 A1* | 1/2022 | Bliss ................... H04L 12/1822 |
| 2022/0070013 A1 | 3/2022 | Barzilay et al. |
| 2022/0070232 A1 | 3/2022 | Young |
| 2022/0108413 A1 | 4/2022 | Hack et al. |
| 2022/0124286 A1 | 4/2022 | Punwani et al. |
| 2022/0317830 A1 | 10/2022 | Skuratowicz et al. |
| 2022/0321370 A1 | 10/2022 | Skuratowicz et al. |
| 2022/0321507 A1 | 10/2022 | Skuratowicz et al. |
| 2022/0321613 A1 | 10/2022 | Lin et al. |
| 2023/0020654 A1 | 1/2023 | Foster et al. |
| 2023/0032545 A1 | 2/2023 | Mindlin et al. |
| 2023/0032922 A1 | 2/2023 | Lin et al. |
| 2023/0086906 A1 | 3/2023 | Tang et al. |
| 2023/0138534 A1 | 5/2023 | Adams et al. |
| 2023/0171118 A1 | 6/2023 | Oono et al. |

FOREIGN PATENT DOCUMENTS

| | | | |
|---|---|---|---|
| JP | 2022-027062 A | 2/2022 | |
| WO | WO 2015/041417 A1 | 3/2015 | |
| WO | WO-2015164521 A1 * | 10/2015 | ............ G06F 21/10 |
| WO | WO 2021/154651 A1 | 8/2021 | |
| WO | WO 2021/205240 A1 | 10/2021 | |

OTHER PUBLICATIONS

U.S. Appl. No. 17/527,088, filed Nov. 15, 2021, Zhang.
U.S. Appl. No. 17/527,066, filed Nov. 15, 2021, Zhang.
International Patent Application No. PCT/SG2022/050806; Int'l Search Report; dated Jul. 13, 2023; 7 pages.
Withee et al; "How to Use Microsoft Teams"; web.archive.org/web/20211209010716/https://www.dummies.com/article/technology/software/Microsoft-products/general-microsoft/how-to-use-microsoft-teams-259020; Dummies; Oct. 2021; accessed May 19, 2023; 11 pages.
Harisudhakar VPD; "New and improved search results experience on Microsoft Teams"; https://web.archive.org/web/20220425173452/https://techcommunity.microsoft.com/t5/microsoft-teams-blog/new-and-improved-search-results-experience-onmicrosoft-teams/ba-p/3035064; Microsoft; Dec. 2021; accessed Feb. 17, 2024; 20 pages.
International Patent Application No. PCT/SG2023/050402; Int'l Search Report; dated Nov. 21, 2023; 4 pages.
International Patent Application No. PCT/SG2023/050375; Int'l Search Report; dated Dec. 29, 2023; 5 pages.

* cited by examiner

400

Aggregate data shared by at least a subset of a plurality of users via a plurality of message threads and a plurality of virtual rooms in the workspace 402

Categorize the data into a plurality of categories based on determining relatedness of the data 404

Classify data associated with any category among the plurality of categories based on a plurality of types of the data associated with the category 406

Cause one of the plurality of types of the data associated with the category to be displayed on a first computing device associated with a first user among the plurality of users 408

Aggregate data shared by at least a subset of a plurality of users via a plurality of message threads and a plurality of virtual rooms in the workspace 602

Automatically generate a plurality of topics based on at least a subset of the data and predetermined rules 604

Categorize the data into a plurality of categories based on the plurality of topics associated with the data 606

Classify data associated with any category among the plurality of categories based on a plurality of types of the data associated with the category 608

Cause to display an interface associated with the category based on a selection of the category by a first user among the plurality of users, wherein the interface comprises information about the plurality of types of the data associated with the category 610

Cause one of the plurality of types of the data associated with the category to be displayed on a first computing device associated with a first user among the plurality of users 612

FIG. 6

FACILITATING COLLABORATION IN A WORK ENVIRONMENT

CROSS REFERENCE TO RELATED APPLICATION

The present application is a continuation-in-part of U.S. patent application Ser. No. 17/527,078, filed on Nov. 15, 2021, the disclosure of which is incorporated herein by reference in its entirety.

BACKGROUND

Communication is increasingly being conducted using Internet-based tools. The Internet-based tools may be any software or platform. Existing communication platforms enable users to communicate with each other by sharing text, images, videos, and other information via app or web pages. People continue to desire new ways for communication via Internet-based tools.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example process for facilitating communication, which may be performed by a communication system in accordance with the present disclosure.

FIG. 6 shows an example process for facilitating communication, which may be performed by a communication system in accordance with the present disclosure.

DETAILED DESCRIPTION OF ILLUSTRATIVE EMBODIMENTS

Figure 1:
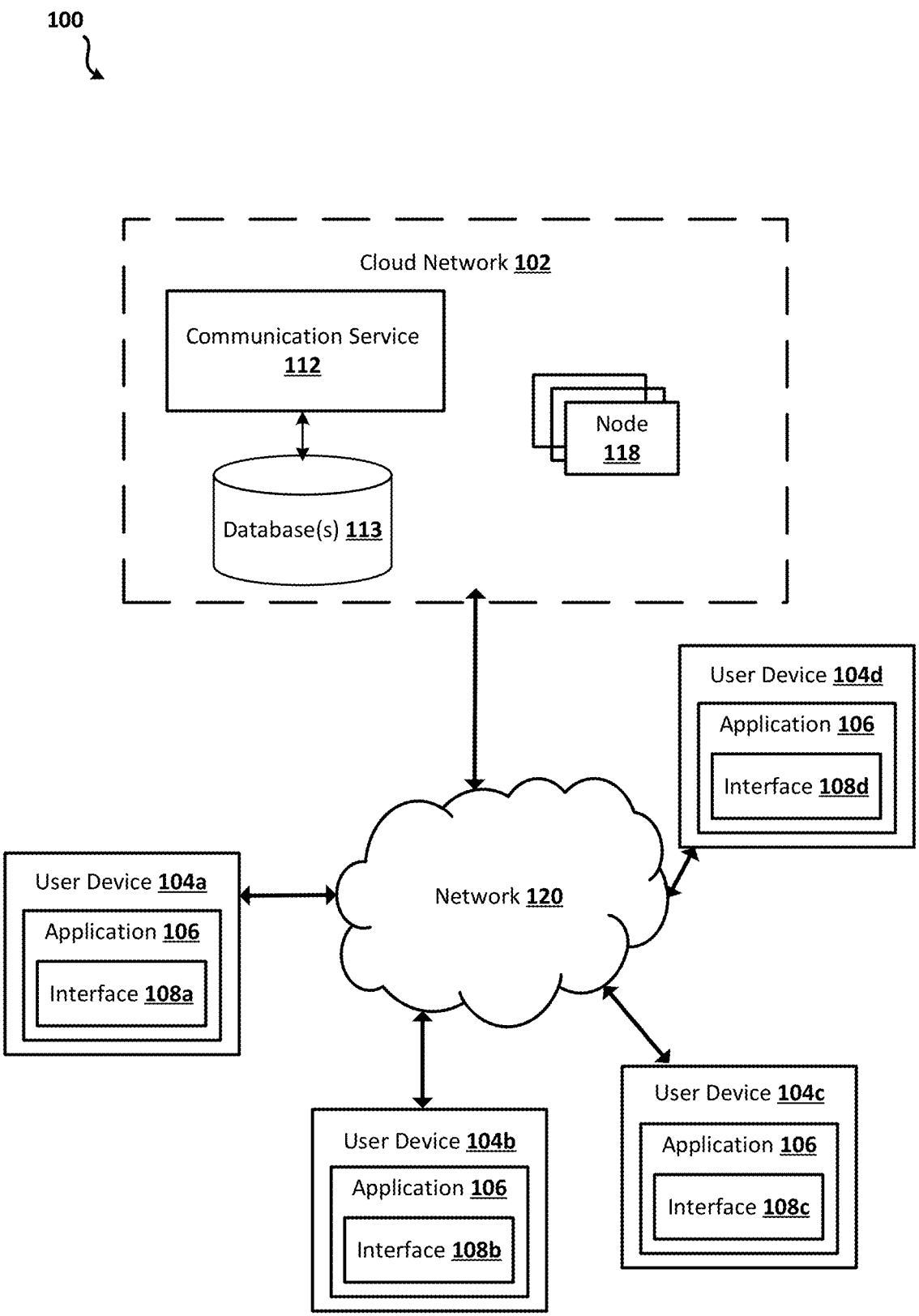
FIG. 1 shows an example system for facilitating communication in accordance with the present disclosure.

Existing internet-based communication tools may facilitate communication between two or more people, such as two or more co-workers. For example, existing internet-based communication tools may facilitate a video conference between two or more people. Likewise, existing internet-based communication tools may facilitate a text messaging and/or instant messaging exchange between two or more people. If such existing internet-based communication tools are utilized within a work environment, such as to facilitate communication amongst the employees of the work environment, the internet-based communication tools may be responsible for managing vast amounts of information exchanged between the employees. The amount of information managed by such internet-based communication tools may continue to grow over time.

However, as the amount of information managed by such internet-based communication tools continues to grow, it may be increasingly difficult to organize the information. For example, it may be difficult for users of the internet-based communication tools to find relevant information via the tool. Thus, users of internet-based communication tools may spend large amounts of time searching for information, such as searching for information or messages previously exchanged via the tool (e.g., downloading the same file multiple times, digging through endless document folders, searching email archives, etc.) Such searching is inefficient and leads to a lack of productivity in the work environment. In some instances, users may be unable to find the information they are searching for. As a result, some users may waste time recreating information. Thus, improved internet-based communication tools that increase productivity are desirable.

An improved internet-based communication tool is described herein. Such an improved internet-based communication tool addresses the shortcomings of existing internet-based communication tools by increasing productivity amongst its users. For example, the internet-based communication tool described herein may decrease the amount of time that users spend searching for or recreating information that was previously exchanged via the tool. Such an improved internet-based communication tool may be utilized as a part of the example system 100 illustrated in FIG. 1. The system 100 may comprise a cloud network 102 and a plurality of user devices 104a-d. The cloud network 102 and the plurality of user devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 may comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a communication service 112. The plurality of computing nodes 118 may process tasks associated with the communication service 112.

The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the communication service 112 facilitates communication (e.g., synchronous communication and/or asynchronous communication) between users associated with the plurality of user devices 104*a-d*. The communication service 112 is discussed below in more detail with regard to FIG. 2.

In an embodiment, the plurality of user devices 104 are configured to access the communication service 112. For example, one or more of the user devices 104 may send, to the communication service 112, a connection request. The connection requests may comprise requests from the user devices 104*a-d* to connect to the communication service 112.

A user device 104*a-d* may comprise an application 106. The application 106 outputs (e.g., display, render, present) user interface(s) of the communication service 112 via an interface 108*a-d*. The users associated with the user devices 104*a-d* may interact with the user interface(s) of the communication service 112 to communicate with and/or build relationships with the other users of the communication service 112. For example, the user associated with the user device 104*a* may interact with the user interface(s) of the communication service 112 to communicate with and/or build relationships with one or more of the users associated with the user devices 104*b-d*.

The plurality of user devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like.

The plurality of user devices 104 may be associated with one or more users. For example, the one or more users may be co-workers or colleagues. As another example, the one or more users may be friends, students, or any other group of people that want to or need to communicate with one another. A single user may use one or more of the user devices 104 to access the cloud network 102. The plurality of user devices 104 may travel to a variety of locations and use different networks to access the cloud network 102.

The communication service 112 may be configured to store data associated with the communication service 112, such as in one or more databases 113. The one or more databases 113 may be configured to store data associated with the users of the communication service 112, data associated with virtual room(s) (e.g., space(s)) for communication provided by the communication service 112, and/or data associated with past communication, current communication, or future scheduled communication amongst the users of the communication service 112. The one or more databases 113 and the data stored within the one or more databases 113 are discussed below in more detail with regard to FIG. 2.

Figure 2:
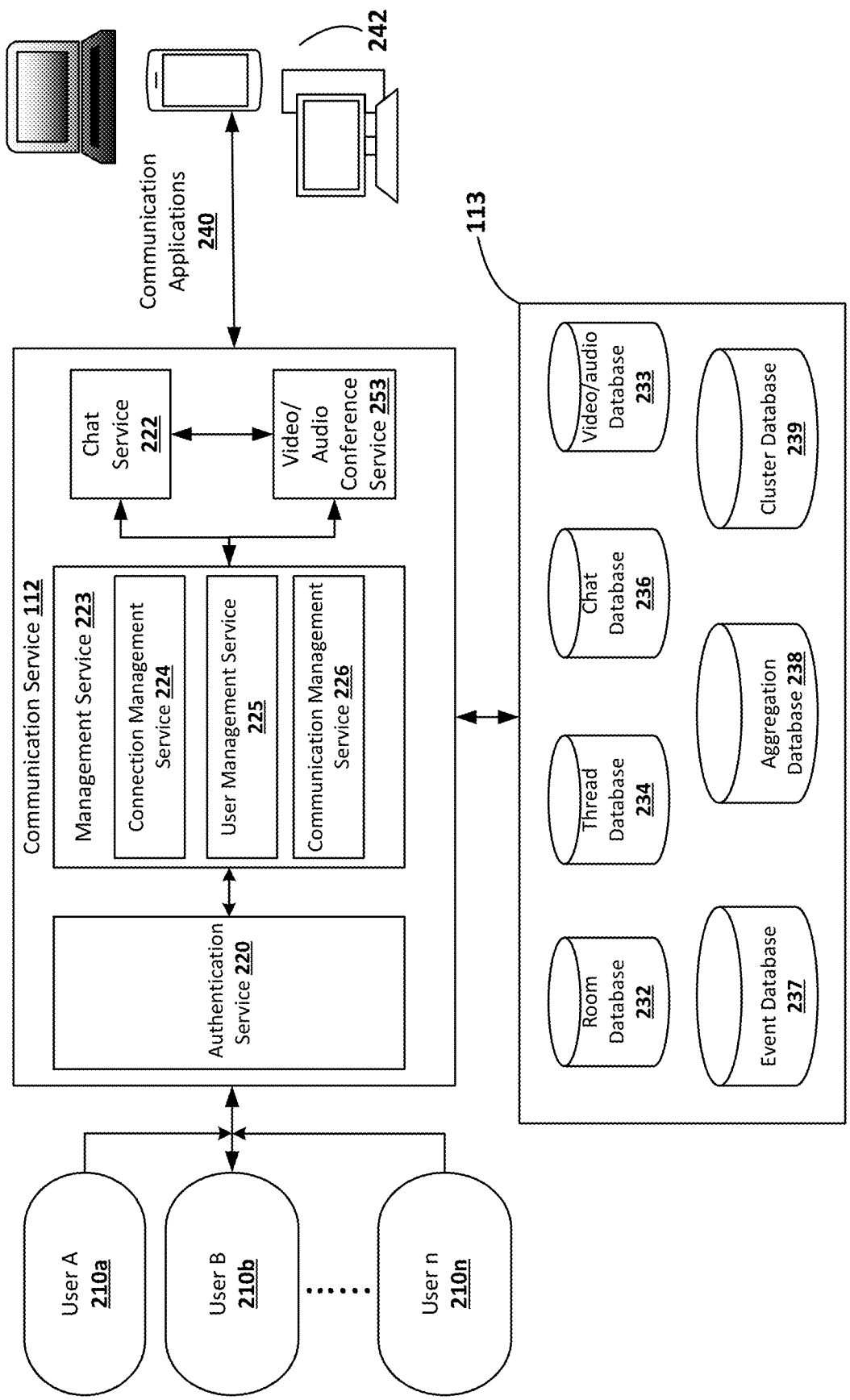
FIG. 2 shows an example system for facilitating communication in accordance with the present disclosure.

FIG. 2 shows an example system 200 for communication. The system 200 includes the communication service 112 and the database(s) 113 described above with regard to FIG. 1. By way of example and without limitation, the communication service 112 may run on the cloud network 102 in FIG. 1. The communication service 112 may include a combination of cloud network devices and local devices. The communication service 112 may facilitate communication amongst the users 210*a-n*. The users 210 may be users of a communication application 240 operating on user devices 242. The database(s) 113 may include one or more of a room database 232, a message thread database 234, a chat database 236, a video/audio database 233, an event database 237, an aggregation database 238, and/or a cluster database 239.

The communication service 112 may include an authentication service 220. The authentication service 220 may authorize and verify access to the other services provided by the communication service 112. The authentication service 220 may grant users access to the communication service 112. For instance, the authentication service 220 may receive connection requests from the users 210*a-n*. The connection requests may be requests to connect to the communication service 112. The authentication service 220 may, in response to such connection requests, grant or deny access to users.

The communication service 112 may include a management service 223. The management service 223 may manage communication amongst users 210*a-n* that have been connected to the communication service 112. For example, the management service 223 may manage communication amongst users 210*a-n* that have been granted access to the communication service 112 by the authentication service 220. The management service 223 may include a connection management service 224, a user management service 225, and/or a communication management service 226.

In an embodiment, the communication service 112 provides a plurality of virtual room (e.g., spaces) in a workspace to the users 210*a-n*. Each of the plurality of virtual rooms may be a virtual object that allows users 210*a-n* to associate with it to exchange information that is stored in association with the virtual room. Each virtual room enables users who associate with the virtual room to communicate in real time, non-real time etc., with other users associated with the virtual room. One or more of the virtual rooms may also enable certain communications from unassociated users to be communicated with internal users. A user 210*a-n* may be present in one virtual room at a time, or multiple virtual rooms at a time. At any given time, zero, one, or multiple users may be present in any given virtual room.

In embodiments, the communication service 112 may maintain, in the room database(s) 232, data associated with the virtual room(s). For example, the room database(s) 232 may store data associated with the IDs of each of the virtual rooms. Each virtual room may be implemented as a data structure and one or more software functions that track users, permissions, any data that is exchanged between users 210a-n, and time association(s) of when users 210a-n associate (join the virtual room) and disassociate (leave the virtual room). In certain embodiments, each virtual room is associated with a calendar that indicates events or meetings associated with that virtual room.

In embodiments, any user that has joined a virtual room, would have the ability to review the history of communications that occurred in the virtual room. For example, a user that joined a virtual room at a time A could peruse the history of communications that occurred in that virtual room before time A, and from that gain an understanding of the development of the communication within the virtual room over time without the need to review an archive that would otherwise lack context. In that sense, the virtual room becomes a way of organizing an information exchange while preserving the historical context around particular items of communication.

In embodiments, each of the virtual rooms may be associated with a particular subject. The users 210a-n may associate themselves with (e.g., join, enter) a virtual room that is associated with a subject of interest. Within each virtual room, the users 210a-n that have joined that virtual room can communicate with each other, such as about the subject associated with that virtual room. In some embodiments, each of the virtual rooms may be associated with a particular work project or team of co-workers.

In embodiments, the users 210a-n may need permission to join one or more of the virtual rooms from the plurality of virtual rooms. For example, the users 210a-n may need to be given access to join a particular virtual room, such as by an administrator associated with the virtual room. The users 210a-n may need permission to join some of the virtual rooms of the plurality of virtual rooms, while other virtual rooms of the plurality of spaces may be open to any user 210a-n to join (without requiring permission or authentication). In some embodiments, the users 210a-n do not need permission to join any of the virtual rooms from the plurality of spaces. Instead, the users 210a-n may freely join and leave the virtual rooms.

In embodiments, the users 210a-n may automatically be located in a default virtual room once an application 240 associated with the communication service 112 starts to run on a computing device (e.g., client device 104a-d) associated with the users 210a-n. The default virtual room may be, in some instances, selected by the users 210a-n themselves. For example, a user 210a may select a virtual room that he or she spends most of her time in or a virtual room that indicates the user's work context as that user's default virtual room. As another example, a user 210b may select a virtual room that is of highest interest to the user as that user's default room. The default virtual room for a particular user may, in some instances, be selected by the communication service 112. For example, the communication service 112 may automatically select a virtual room for a particular user based on that user's behaviors, work context, or preferences, such as which virtual rooms that user visits, for how long the user visits those rooms, and which projects or subjects are of interest to the user. In some embodiments, the default virtual room for a particular user may be selected by that user's colleague, such as that user's boss or superior.

In some embodiments, a user 210a-n may, after opening the application 240 associated with the communication service 112 and being placed in that user's default virtual room, want to enter a different virtual room. For example, the user 210a-n may want to communicate with other users that are in a virtual room different from the user's default virtual room. As another example, the user 210a-n may want to communicate about the subject or project associated with a virtual room different from the user's default virtual room. If a user 210a-n, after opening the application 240 associated with the communication service 112 and being placed in that user's default virtual room, wants to be located in a different virtual room, the user may join (e.g., enter) the different virtual room. If the user joins the different virtual room, the user may no longer be located in that user's default virtual room.

In embodiments, the communication service 112 may display an avatar associated with each user 210a-n on an interface of the application 240. The avatar associated with a particular user may, for example, be displayed in a representation corresponding to the virtual room that the user is currently located in. In this manner, the users of the communication service 112 are able to see which virtual rooms other users are in. For example, when a user opens the application 240 associated with the communication service 112 and is placed in that user's default virtual room, an avatar associated with the user may be displayed in a representation corresponding to the user's default virtual room. If the user later enters a different room, the user's avatar will no longer be displayed in the representation corresponding to the user's default virtual room. Instead, the user's avatar will be displayed in the representation corresponding to the newly entered virtual room.

In embodiments, the connection management service 224 may connect one or more users 210a-n to a particular virtual room. For example, when a user 210a-n becomes connected to the communication service 112 (e.g., once an application 240 associated with the communication service 112 starts to run on a computing device), the connection management service 224 may automatically connect the user 210a-n to his or her default virtual room. For example, the connection management service 224 may retrieve, from the room database(s) 232, data indicative of an identification number (ID) associated with the default virtual room associated with the user 210a-n. The connection management service 224 may utilize said data to connect the user 210a-n to the user's default virtual room. After connecting a user to the default virtual room, the connection management service 224 may store, in the room database(s) 232, data indicating that that particular user has joined the default virtual room and/or at what time that particular user joined the default virtual room.

In embodiments, if the user wants to enter a virtual room different from his or her virtual room, the connection management service 224 may receive, from a user 210a-n, data indicative of a request to join a different virtual room. The connection management service 224 may retrieve, from the room database(s) 232, data indicative of an identification number (ID) associated with the virtual room that the user 210a-n wants to associate with. The connection management service 224 may utilize said data to connect the user 210a-n to the virtual room that the user has requested to be connected with. After connecting a user to the different virtual room, the connection management service 224 may store, in the room database(s) 232, data indicating that that particular user has joined that different virtual room and/or at what time that particular user joined that particular virtual room.

If the user has requested to join a virtual room that the user needs permission to join, the connection management service 224 can retrieve, from the room database(s) 232, data indicating whether or not the user has permission to join that particular virtual room. If the user does have permission, the connection management service 224 may connect the user 210a-n to the virtual room that the user has requested to be connected with. Conversely, if the user does not have permission, the connection management service 224 may not connect the user 210a-n to the virtual room that the user has requested to be connected with.

In embodiments, all of the users that are located in a particular virtual room may communicate asynchronously with each other via the communication service 112. For example, the users 210a-n may text message and/or instant message each other and/or may post comments related to content previously shared by other users. The communication management service 226 facilitates such asynchronous communication amongst users 210a-n. For example, the communication management service 226 may initiate a communication channel between two users via a chat service 222 so that they may participate in asynchronous communication with each other. The communication channel may be initiated, for example, within the virtual room that the two users are in. For example, the communication management service 226 may initiate a communication channel between two users via the chat service 222 in response to receiving a request to start a chat. The chat service 222 may be a device and/or a program running on a device of the communication service 112.

In embodiments, users may be able to participate in non-real time communication (but not real-time communication) within a virtual room without entering the virtual room. For example, while a user is located in a first virtual room, the user may be able to view an asynchronous text chat or a message thread located in a different virtual room. Each virtual room may contain an asynchronous text chat and/or one or more message threads. Each message thread may be associated with a particular conversation subject within that virtual room. For example, a message thread may include running commentary of text messages pertaining to one subject or question. The asynchronous text chat may be a continuous chat stream and may be related to a variety of different conversation subjects. In some embodiments, the user may be able to send messages in the asynchronous text chat and/or one or more message threads located in the different virtual room without entering the different virtual room. However, the user may need to enter the different virtual room if the user wants to participate in real-time communication, such as a bubble chat or a synchronous audio or video meeting in the different virtual room.

The chat service 222 may be configured to receive inputs from users 210. The user inputs may include text messages and/or instant messages, such as those shared in an asynchronous text chat and/or one or more message threads. Participants of an asynchronous communication may comprise any users 210a-n who are allowed to participate in the asynchronous communication in any manner. The chat service 222 may manage the asynchronous communication. For instance, the chat service 222 may categorize the conversations. The chat service 222 may store the messages in the message thread(s), any associations with the messages in the message thread(s), and/or message thread metadata in the message thread database(s) 234. Likewise, the chat service 222 may store the messages associated with the asynchronous text chat in each virtual room in the chat database(s) 236. The chat service 222 may update, in the database(s) 234 and 236, the data when a new message in a message thread and/or a new message in an asynchronous communication between the users 210a-n occurs.

In certain embodiments, some or all of messages, such as those shared in an asynchronous text chat and/or one or more message threads, may be associated with one or more topics. The topic(s) associated with a particular message may indicate, for example, a theme, subject matter, or category associated with that message. The topic(s) associated with a particular message may, for example, be included as additional text along with the body of the message itself. In certain embodiments, the topic may be included after the body of the message along with a predetermined character, such as along with a hashtag (e.g., "first message body #topic", "second message body #topic 1 #topic 2", etc.).

Figure 8:
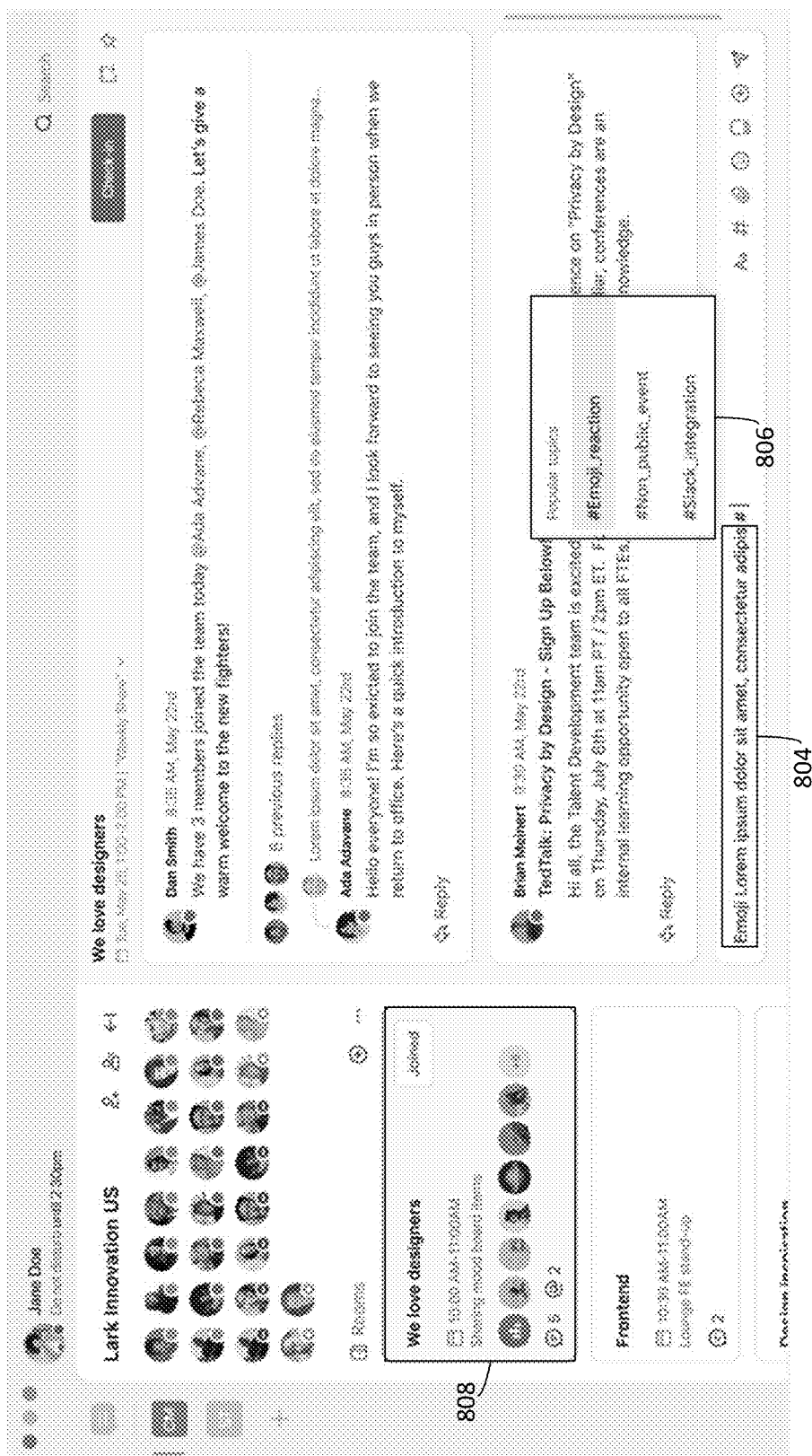
FIG. 8 shows an example user interface for facilitating communication in accordance with the present disclosure.

In embodiments, the topic(s) associated with a message in an asynchronous text chat and/or in a message thread may be generated and/or selected by the user 210a-n that created the message. FIG. 8 illustrates a UI 800 that shows a user 210a-n typing a message 804 into a text bar associated with new message thread. The new message thread may be associated with a particular virtual room, such as the virtual room represented by the room card 808. The user 210a-n that is typing the message 804 into the text bar associated with the new message thread may or may not be located in the virtual room represented by the room card 808. After the user types the body of the message 804 (e.g., the text that the user wants to share in the new message thread), the user may type a predetermined symbol or character (e.g., #). If the user types the predetermined symbol or character, the user may be able to type a word or phrase indicative of a topic associated with the message. If the user wants to add one or more additional topics, the user can type the predetermined symbol or character again and type another word or phrase indicative of a topic associated with the message.

In certain embodiments, as shown in box 806 of FIG. 8, the communication service 112 may prompt the user with various suggested topic options after the user types the symbol. The topic suggestions may be those that have been automatically generated by the communication service 112, such as based on a title or ID of the message thread, virtual room, bubble chat, etc. In some embodiments, the communication service 112 may additionally or alternatively parse the body of the message 804 to automatically generate the suggested topics. In certain embodiments, the communication service 112 may populate the box 806 with topics that are popular amongst other users of the communication service 112. The user may select one of these topics that have been automatically generated by the communication service 112 from the box 806 instead of entering a topic manually.

Figure 9:
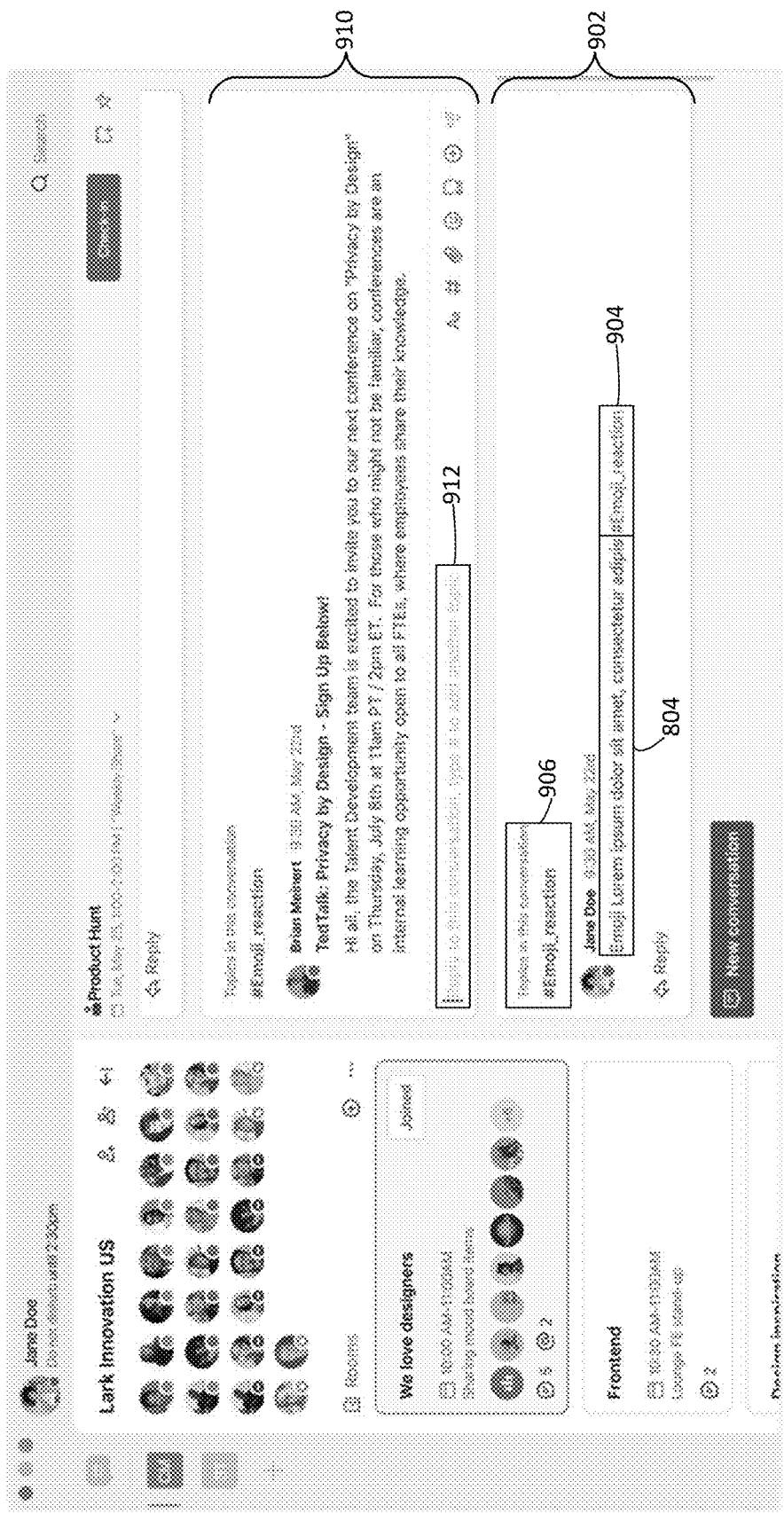
FIG. 9 shows another example user interface for facilitating communication in accordance with the present disclosure.

In embodiments, as shown in the UI 900 of FIG. 9, after the user has generated and/or selected the topic associated with the message 804, the user may enter or send the message to create the message thread 902. The message thread 902 may include the message 804 along with the topic 904 selected or generated by the user. In certain embodiments, each message thread may indicate in a header 906 all of the topics associated with messages in that thread. For example, if a message thread includes hundreds of messages associated with various topics, the header associated with the message thread may indicate, in one central location, all of the topics associated with those hundreds of messages.

Figure 10:
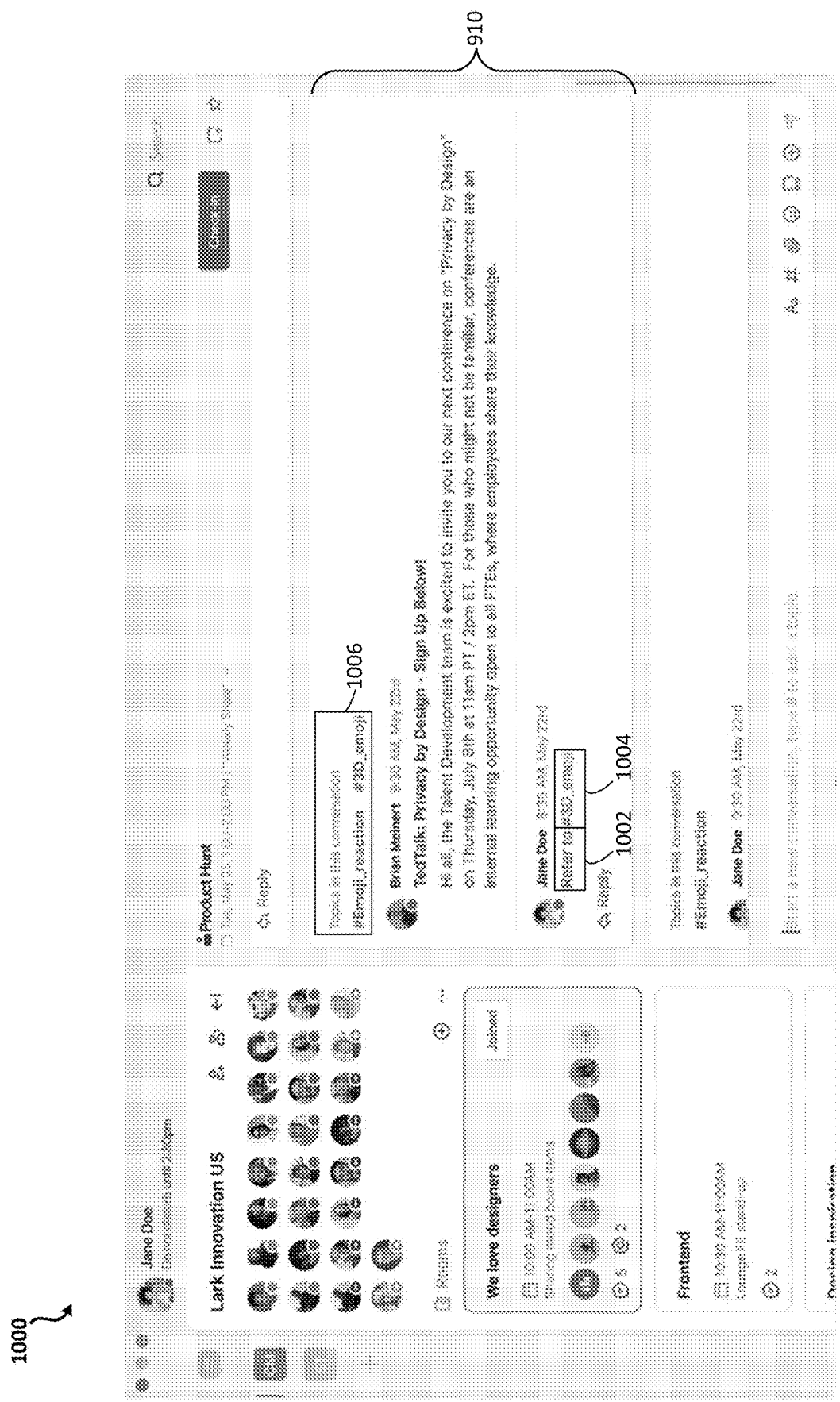
FIG. 10 shows another example user interface for facilitating communication in accordance with the present disclosure.

In certain embodiments, the user may want to respond to a different message thread, such as the message thread 910. To do so, the user may begin typing in a text box 912 associated with the message thread 910. The user may respond to the message thread 910 with a message that includes both text and one or more topics. As shown in the UI 1000 of FIG. 10, the user may respond to the message thread 910 with a message including the body of the message 1002 and the topic 1004. If the topic 1004 has not been previously included in any other message in the thread, it may not have already been displayed in the header 1006 associated with the message thread 910. Thus, after the user sends the message 1002 associated with the topic 1004, the header 1006 may be updated to reflect the topic 1004 (as well as any other topics that are already present in the message thread 910).

Figure 11:
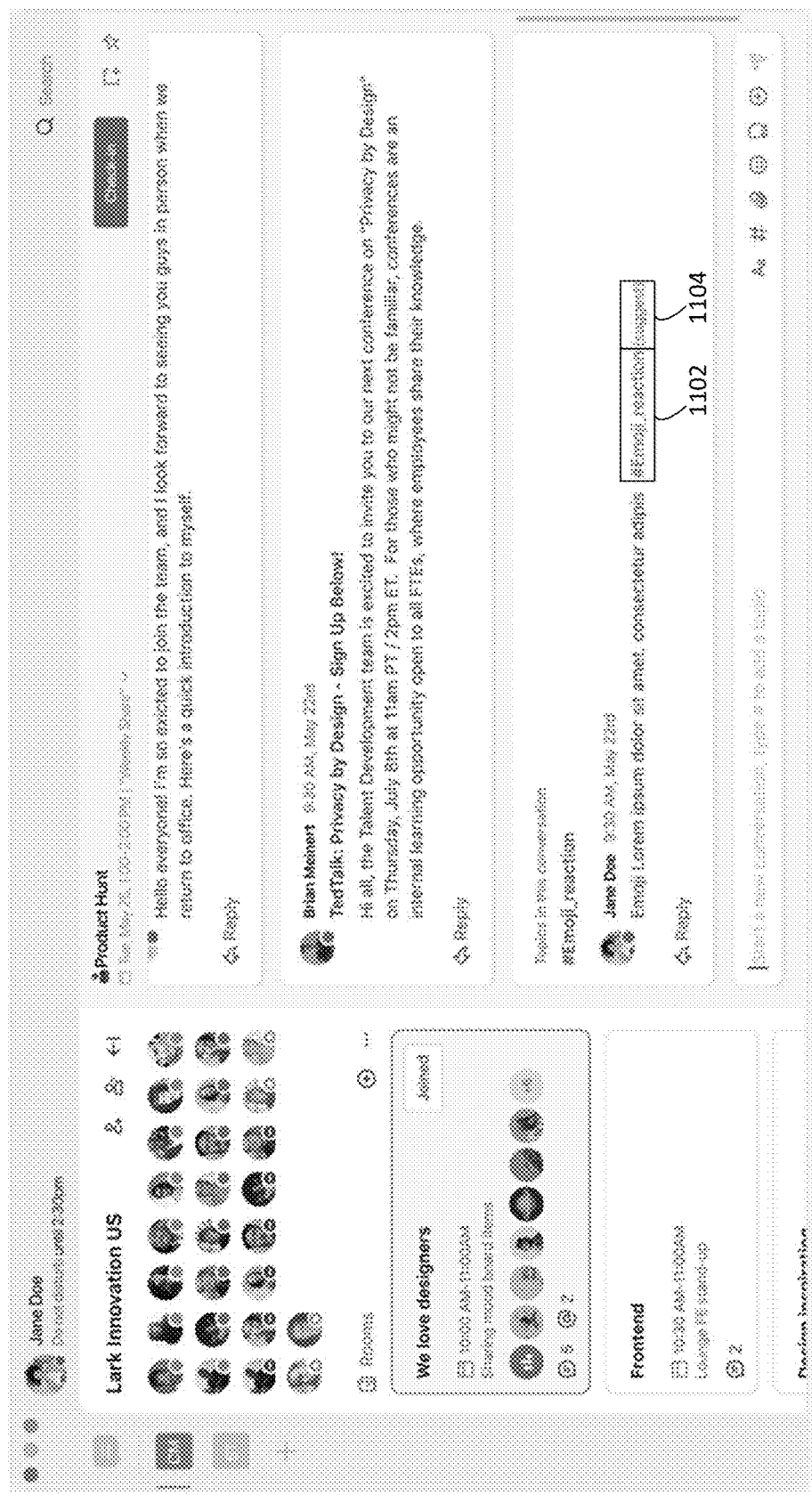
FIG. 11 shows another example user interface for facilitating communication in accordance with the present disclosure.

Referring back to FIG. 2, the communication service 112 may, in some embodiments, retroactively assign topics to previous and/or existing messages that were sent to a message thread and/or to an asynchronous chat. Such previous and/or existing messages may have been sent without being associated with a topic. In other embodiments, a previous and/or existing message may have been sent with one or more associated topics, and the communication service 112 may retroactively assign additional topics to the message. For example, the communication service 112 may retroactively assign a topic to a message based on one or more of a title of message thread or an asynchronous chat that the message belongs to, a user that sent the message, the actual text of the message, etc. As shown in the UI 1100 of FIG. 11, if a topic 1102 is one that is retroactively assigned to a message by the communication service 112, an indicator 1104 may be displayed. The indicator 1104 may indicate that the topic was retroactively assigned to a message by the communication service 112 and was not created and/or selected by the user that generated the message.

Referring back to FIG. 2, in an embodiment, any or all of the users that are located in a particular virtual room may communicate synchronously with each other via the communication service 112. For example, the users 210*a-n* may video and/or audio conference with each other. The communication management service 226 facilitates such synchronous communication amongst users 210*a-n*. For example, the communication management service 226 may initiate a communication channel between two users via a video/audio conference service 253 so that they may participate in synchronous communication with each other. The communication channel may be initiated, for example, within the virtual room that the two users are in. For example, the communication management service 226 may initiate a communication channel via the video/audio conference service 253 between two users via the video/audio conference service 253 in response to receiving a request to start a video/audio conference. The video/audio conference service 253 may be a device and/or a program running on a device of the communication service 112.

The video/audio conference service 253 may be configured to receive inputs from users 210. The user inputs may include live video and/or audio feed. Participants of a synchronous communication may comprise any users 210*a-n* who are allowed to participate in the synchronous communication in any manner. The video/audio conference service 253 may manage the synchronous communication. For instance, the video/audio conference service 253 may categorize the conversations. The video/audio conference service 253 may store the video/audio conversations, any associations with the video/audio conversation, and/or video/audio conversation metadata in the database(s) 233. The video/audio conference service 253 may update, in the database(s) 233, the data when a new synchronous communication between the users 210*a-n* occurs.

In embodiments, the users that have joined a particular virtual room may all want to participate in a live, synchronous communication with one another. However, in some instances, only a portion (e.g., subset) of the users that have been connected to a particular virtual room may want to participate in a live, synchronous communication with one another. For example, if three people are in a virtual room, two of the users may want to have a real-time communication with one another, without the third user. The two users may do so by participating in a live bubble chat. The two users may participate in real-time communication inside of the bubble. The bubble may include a communication channel that is not accessible to the third user that is not in the bubble. However, despite only the two users being in the bubble, they are still in the same virtual room as the third user. Therefore, all three users still may communicate via the communication channel associated with that virtual room. The communication channel associated with the bubble chat may be a sub-channel of the communication channel associated with the virtual room.

In some embodiments, the virtual room is more than a mechanism to facilitate real-time communications such as video conference, rather it can function as a repository of information and communications related to a particular subject and provide a history of the development of ideas. For example, the virtual room may store the entire history of all of the forms of communication that occurred in the virtual room, including text messages, videos, documents, uniform resource locator exchanges, and so on.

The user management service 225 may store, in the database(s) 113, data indicative of a status of each user 210*a-n*. The user management service 225 may update/modify such data if/when a user changes his or her status. Additionally, or alternatively, the user management service 225 may update/modify such data if/when the user management service 225 automatically updates a user's status. The user management service 225 may store, in the database(s) 113, data indicative of the location of each user 210*a-n*. The user management service 225 may update/modify the data indicative of the location of each user 210*a-n* when the user's location changes (e.g., the user leaves a virtual space and/or joins a different virtual space, etc.).

In embodiments, the users 210*a-n* can create events or meetings associated with one or more of the virtual rooms. For example, a user can create one or more events, scheduled for some time in the future, that will take place in one or more virtual room(s). Each event may be associated with a time and/or a duration. For example, the user that created the event may assign a start time, end time, and/or a duration to the event. The connection management service 224 may receive, from a user, data indicative of an event. The indication can include the name of the event, a topic associated with the event, the location of the event (e.g., which virtual room the event will take place in), and/or a time or duration associated with the event. The connection management service 224 may store, in the event database(s) 237, the data indicative of an event.

Figure 12:
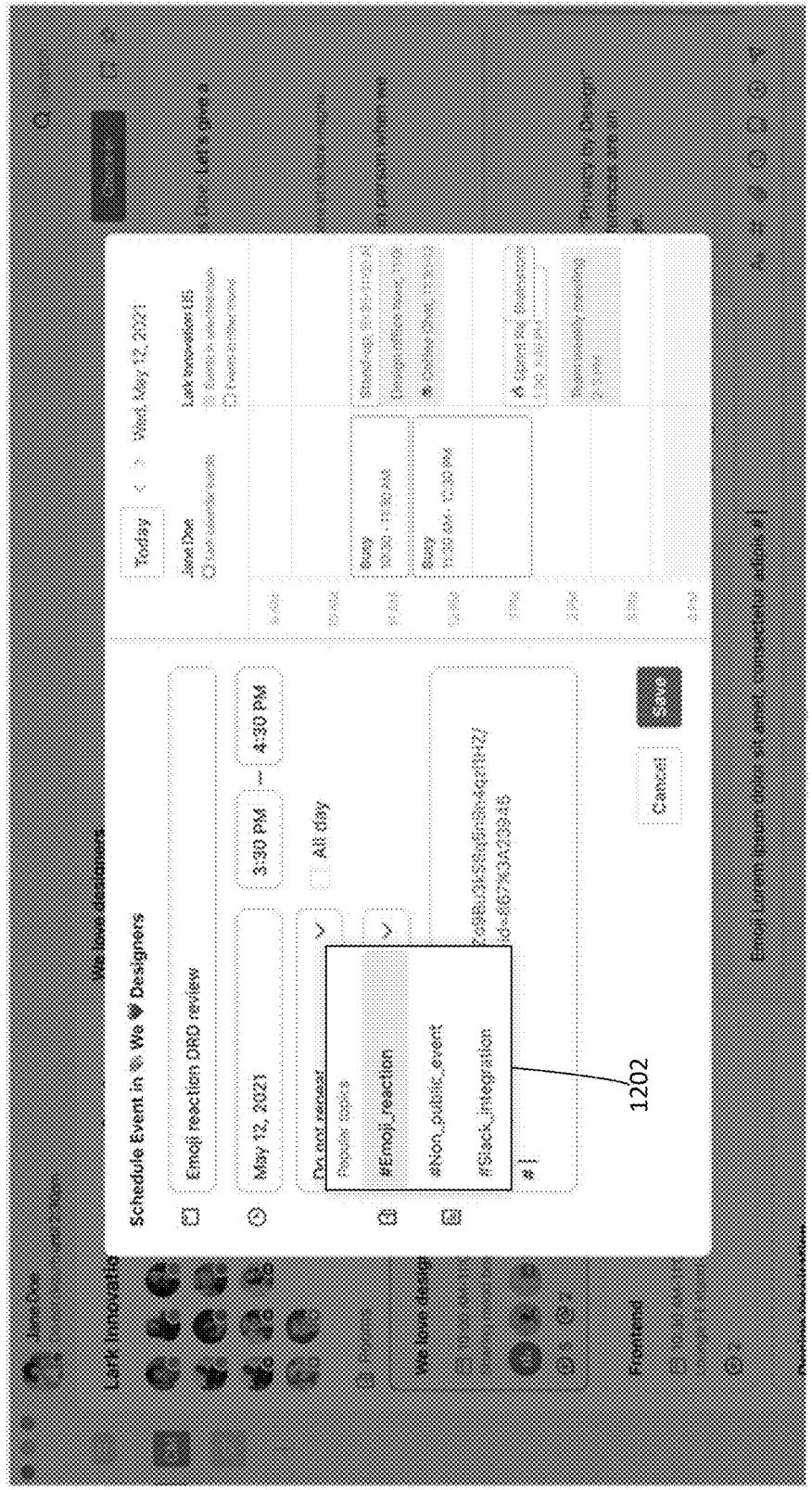
FIG. 12 shows another example user interface for facilitating communication in accordance with the present disclosure.

In certain embodiments, an event may be associated with one or more topics. The topic(s) associated with a particular event may indicate, for example, a theme, subject matter, or category associated with that event. As shown in the UI 1200 of FIG. 12, when a user creates an event in a virtual room, the user can assign one or more related topics to the event. For example, the user can select from one or more suggested topics in a box 1202.

In embodiments, each virtual room may be associated with an event schedule. The event schedule associated with a virtual room indicates one or more of: events that have taken place in the virtual room, events that will take place in the virtual room, and/or events that are currently taking place in the virtual room. The event schedule may indicate topics associated with any of the events. The connection management service 224 may store, in the database(s) 237, data indicative of event schedules associated with various virtual rooms.

Figure 3:
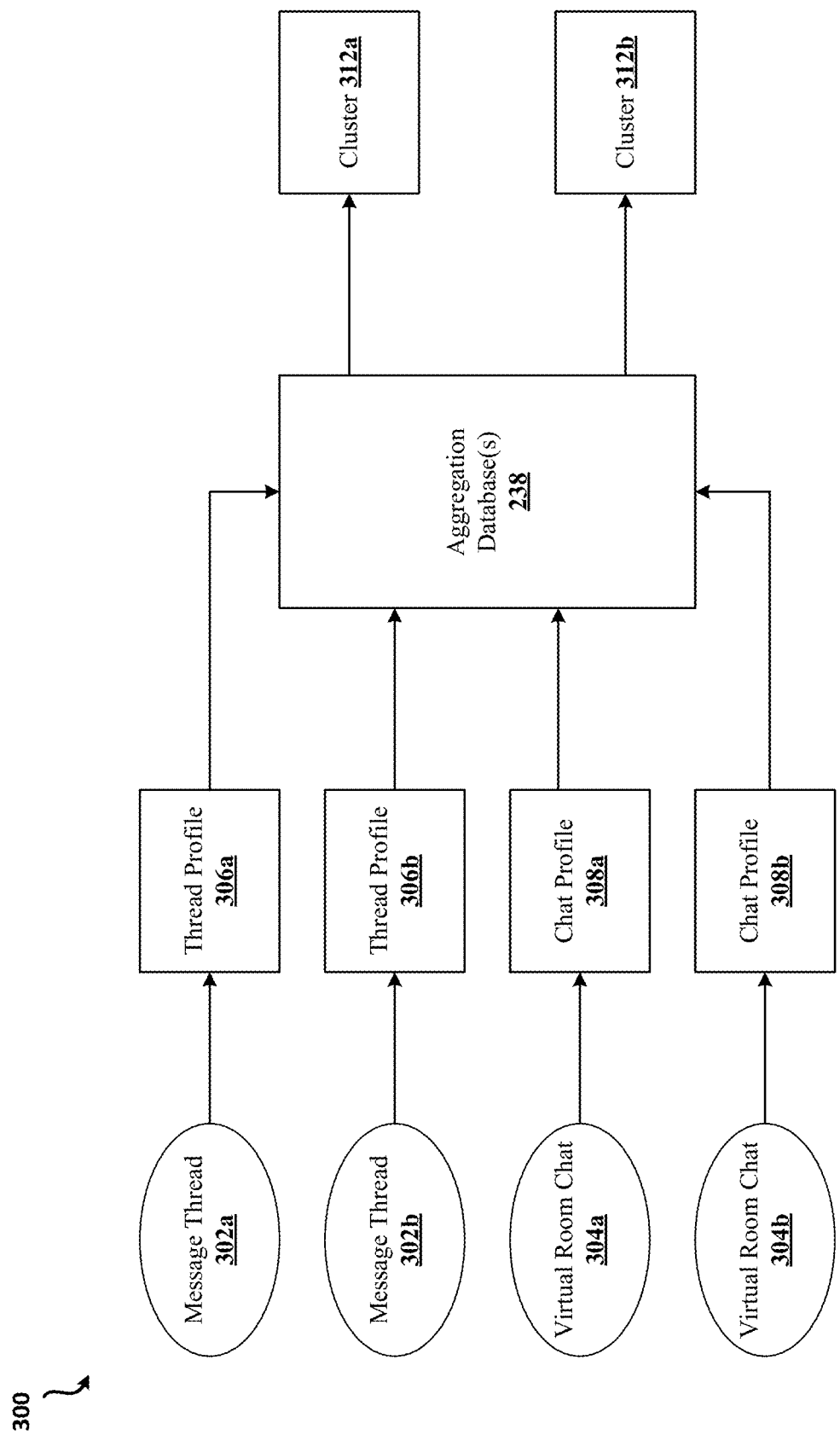
FIG. 3 shows an example framework for facilitating communication in accordance with the present disclosure.

In embodiments, the communication service 112 is configured to aggregate data shared by users 210a-n via message threads and/or virtual rooms. For example, the communication service 112 may aggregate, in an aggregation database 238, data shared by users 210a-n via message threads and/or virtual rooms. The data may include data indicative of messages shared by one or more of the users 210a-n in any and/or all of the message threads. The data may additionally or alternatively include data indicative of messages shared by one or more of the users 210a-n in any and/or all of the chats in the virtual rooms. The data may additionally include events scheduled by users in any of all of the virtual rooms. For example, as shown in the framework 300 depicted in FIG. 3, a plurality of message threads 302a-b may each be associated with a plurality of thread profiles 306a-b. Each thread profile 306a-b may gather all messages and events from a particular message thread, such as message plain text, links in messages, tickers in messages, bubble meetings in threads, scheduled events, kudos, and polls. Likewise, a plurality of virtual room chats may each be associated with a chat profile 308a-b. Each chat profile 308a-b may gather all messages and events from a particular virtual room, such as message plain text, links in messages, tickers in messages, bubble meetings in virtual rooms, scheduled events, kudos, and polls. The data from the thread profiles 306a-b and/or the chat profiles 308a-b may be aggregated in the aggregation database 238.

In embodiments, the communication service 112 is configured to categorize the aggregated data into a plurality of categories based on determining relatedness of the data. For example, the communication service 112 may categorize the data stored in the aggregation database 238 into the plurality of categories based on a plurality of topics associated with the data. For example, the communication service 112 may be configured to categorize the data related to a first virtual room into a plurality of categories based on determining relatedness of the data (e.g., based on a plurality of topics associated with the data). The first virtual room may be any of the virtual rooms in the workspace.

As described above, some or all of the messages shared in an asynchronous text chat and/or one or more message threads, may be associated with one or more topics. Likewise, events may be associated with one or more topics. The topic(s) associated with a particular message or event may indicate, for example, a theme, subject matter, or category associated with that message or event. Thus, two messages that are associated with the same topic are related and/or are likely to be related. Likewise, two events that are associated with the same topic are related and/or are likely to be related. Similarly, an event and a message that are associated with the same topic are related and/or are likely to be related.

Thus, the communication service 112 may categorize all messages and/or events that are associated with a first topic together in one cluster (group, category, etc.), all messages and/or events that are associated with a second topic together in a second cluster, and so on. For example, as shown in the framework 300 depicting in FIG. 3, the data from the thread profiles 306a-b and/or the chat profiles 308a-b aggregated in the aggregation database 238 may be classified into a plurality of clusters 312a-b. Each of the plurality of clusters 312a-b may be associated with a particular topic. Data indicative of each of the plurality of clusters 312a-b may, for example, be stored in the cluster database 239.

In embodiments, the communication service 112 is configured to classify the data categorized into any and/or all clusters based on a plurality of types of the data associated with the category. For example, any one item of data categorized into a particular cluster may be associated with one or more of the following classifications (e.g., types of data): messages, people, files and/or links, and events. Such types of data are intended to be exemplary only, and in embodiments, the categorized data may be classified into any other suitable type of data.

In embodiments, an item of data may be associated with the message classification if the item of data is associated with a message posted in a virtual room chat and/or in a message thread. An item of data may be associated with the event classification if the item of data is associated with an event scheduled by a user of the communication service. At item of data may be associated with the files and/or links classification if the item of data includes a link or file, such as if the item of data is indicative of a message that includes a link or file. Finally, each item of data may be associated with the people classification, as each item of data, whether a message (with or without links/files) or an event, is associated with a user that send the message or scheduled the event. A single item of data may be associated with more than one of the classifications. For example, an item of data may be indicative of a message that includes a link and was sent by a user. Such an item of data may be associated with the message classification, the people classification, and the file and/or link classification.

In embodiments, the communication service 112 is configured to cause the plurality of types of the data (e.g., one of the classifications) associated with any category (e.g., any cluster 312a-b) to be displayed on computing devices 242 associated with the users 210a-n. For example, the communication service 112 may cause one of the plurality of types of the data (e.g., one of the classifications) associated with a particular category or cluster to be displayed on a computing device 242 associated with a user 210a-n based on receiving an indication that a user 210a-n selected that category.

Figure 13:
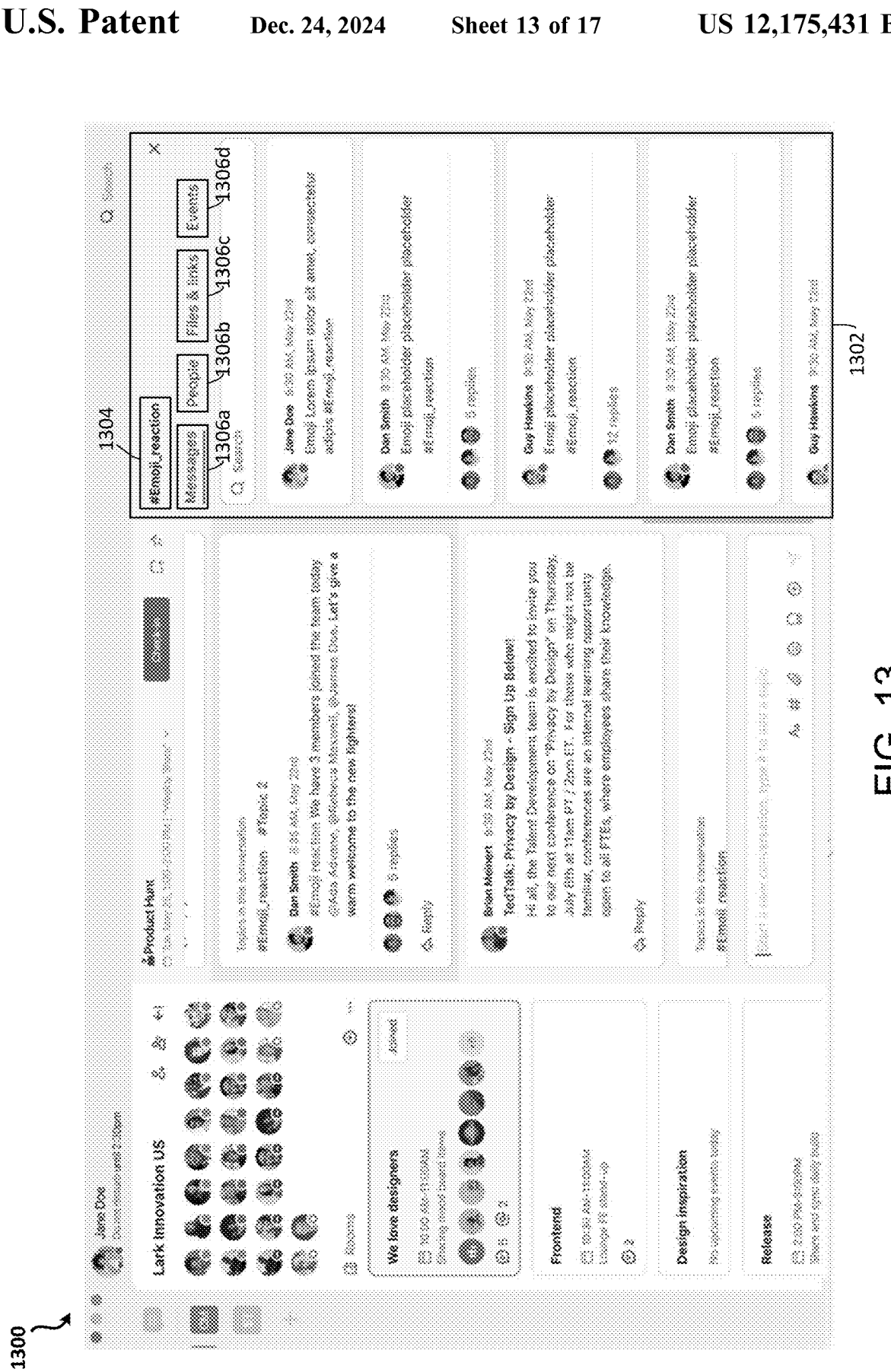
FIG. 13 shows another example user interface for facilitating communication in accordance with the present disclosure.

FIG. 13 shows an example UI 1300 displaying a first type of data associated with a category. A user may select a category, such as by clicking on or selecting a topic 1304. The topic 1304 may be included, for example, in a message or event. For example, the user may be in a virtual room, see the topic 1304 in a chat or thread in the virtual room, and click on the topic 1304. Likewise, the user may see the topic 1304 in a scheduled event and click on the topic 1304. The user may select the topic 1304 for a variety of reasons, such as if the user wants to see, in one central location, all data related to the topic 1304 that has been exchanged via the communication service 112. If the user selects the topic 1304, a panel 1302 may be displayed on the UI 1300. The panel 1302 may be associated with the topic 1304. For example, the panel 1302 may be configured to display all data that has been categorized into the cluster associated with the topic 1304.

In embodiments, the panel 1302 includes separate tabs 1306a-d for different types of data associated with the topic 1304. Each tab 1306a-d may display a different type of data associated with the topic 1304. For example, the tab 1306a may display "message" data associated with the topic 1304. The tab 1306b may display "people" data associated with the topic 1304. The tab 1306c may display "files and/or links" data associated with the topic 1304. The tab 1306d may display "event" data associated with the topic 1304. As described above, a single item of data associated with the topic 1304 may be classified as one or more of these types of data. In embodiments, the panel 1302 may be able to display a single tab 1306*a-d* at a time. In other embodiments, the panel 1302 may be able to display more than one tab 1306*a-d* at a time.

In other embodiments, the different types of data associated with a topic (e.g., topic 1304) may be different virtual rooms from which the data are sourced. Each tab in a panel (e.g., panel 1302) may display a different virtual room from which the data associated with the topic are sourced. For example, a first tab may display "virtual room 1" from which data associated with the topic are sourced. A second tab may display "virtual room 2" from which data associated with the topic are sourced. A third tab may display "virtual room 3" from which data associated with the topic are sourced. A fourth tab may display "virtual room 4" from which data associated with the topic are sourced. There may be more tabs, e.g., "virtual room 5," "virtual room 6," and so on. In some examples, the panel may display a single tab corresponding to a single virtual room at a time. In other examples, the panel may display multiple tabs corresponding to multiple virtual rooms at a time.

In the example of FIG. 13, the tab 1306*a* is open. Thus, data associated with the topic 1304 that is "message" data is displayed in the panel 1302. For example, all messages exchanged via the communication service 112 that include the topic 1304 may be displayed in the panel 1302 when the tab 1306*a* is open. In this manner, the user viewing the UI 1300 may be able to see all messages associated with the topic 1304 in a central location. This may make it easier and more efficient for the user to find a message that he or she is looking for. In certain embodiments, when the user selects the category, such as by clicking on or selecting a topic 1304, the panel 1302 will be displayed and one of the tabs 1306*a-d* will, by default, be opened. If the user wants to instead display a different tab 1306*a-d*, the user may select a different tab 1306*a-d*.

Figure 14:
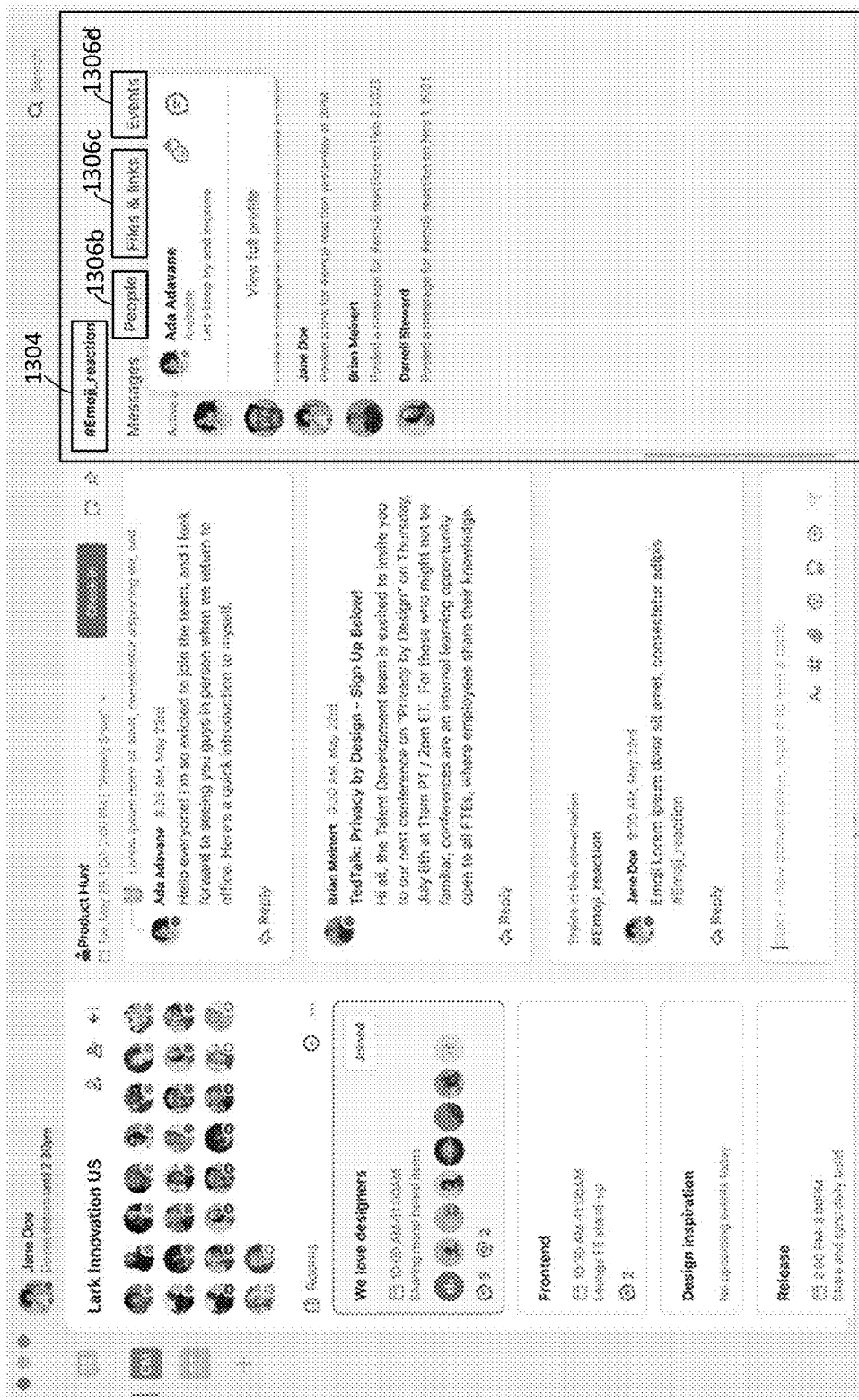
FIG. 14 shows another example user interface for facilitating communication in accordance with the present disclosure.

For example, if the user wants to view the data associated with the topic 1304 that is "people" data, the user may select the tab 1306*b*. FIG. 14 shows an example UI 1400 displaying the tab 1306*b* open in the panel 1302. If the tab 1306*b* is open in the panel 1302, "people" data associated with the topic 1304 may be displayed in the panel 1302. For example, a list of all users of the communication service 112 that have exchanged a message associated with the topic 1304 and/or scheduled an event associated with the topic 1304 may be displayed in the panel 1302 when the tab 1306*b* is open. In this manner, the user viewing the UI 1400 may be able to see all people (e.g., users) who are associated with the topic 1304 in a central location. This may make it easier and more efficient for the user to find a user that he or she is looking for.

Figure 15:
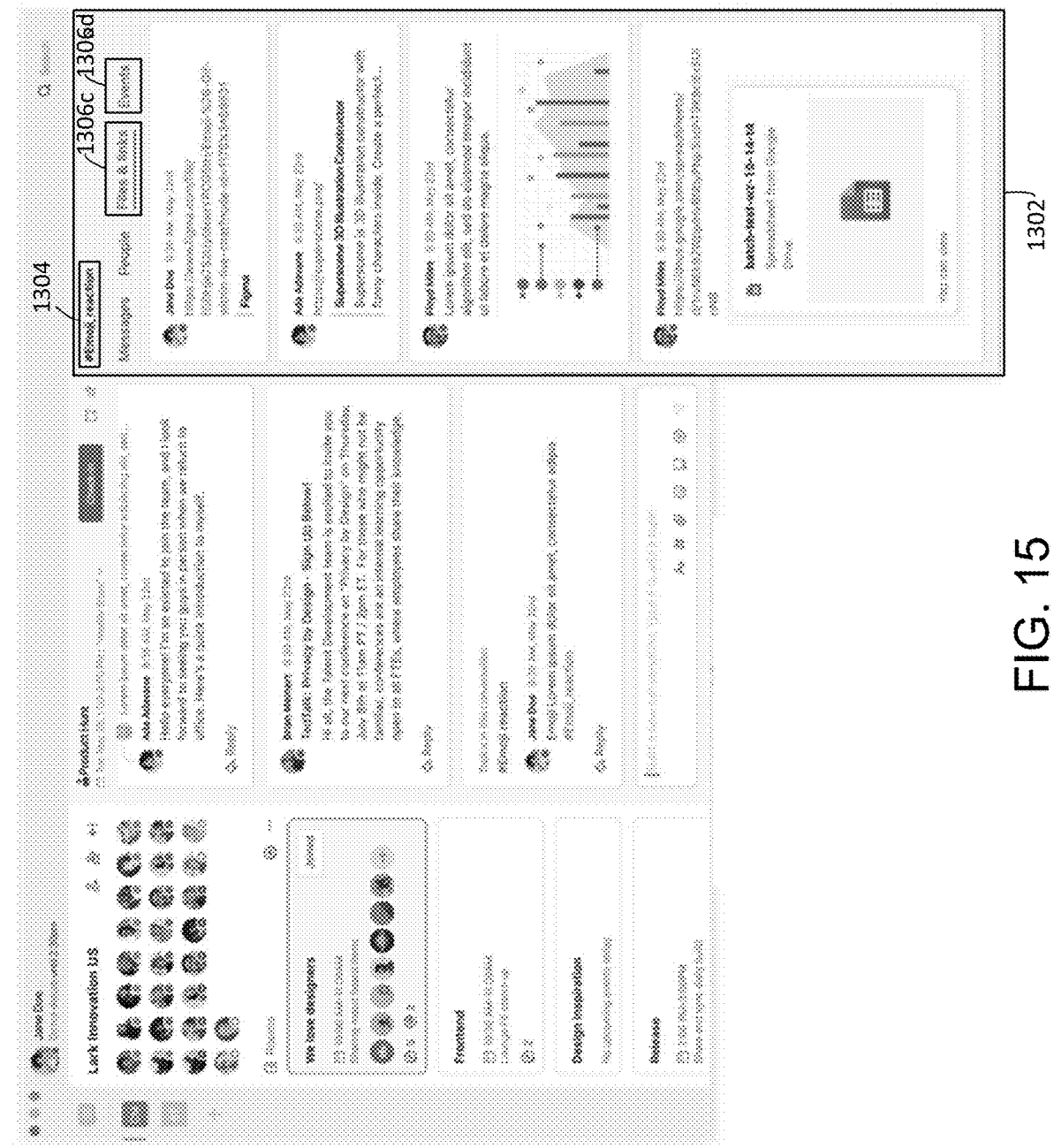
FIG. 15 shows another example user interface for facilitating communication in accordance with the present disclosure.

If the user wants to view the data associated with the topic 1304 that is "files and/or links" data, the user may select the tab 1306*c*. FIG. 15 shows an example UI 1500 displaying the tab 1306*c* open in the panel 1302. If the tab 1306*c* is open in the panel 1302, "files and/or links" data associated with the topic 1304 may be displayed in the panel 1302. For example, a list of all links and/or files associated with the topic 1304 that users of the communication service 112 have exchanged may be displayed in the panel 1302 when the tab 1306*c* is open. In this manner, the user viewing the UI 1500 may be able to see links or files that are associated with the topic 1304 in a central location. This may make it easier and more efficient for the user to find a link or file that he or she is looking for.

Figure 16:
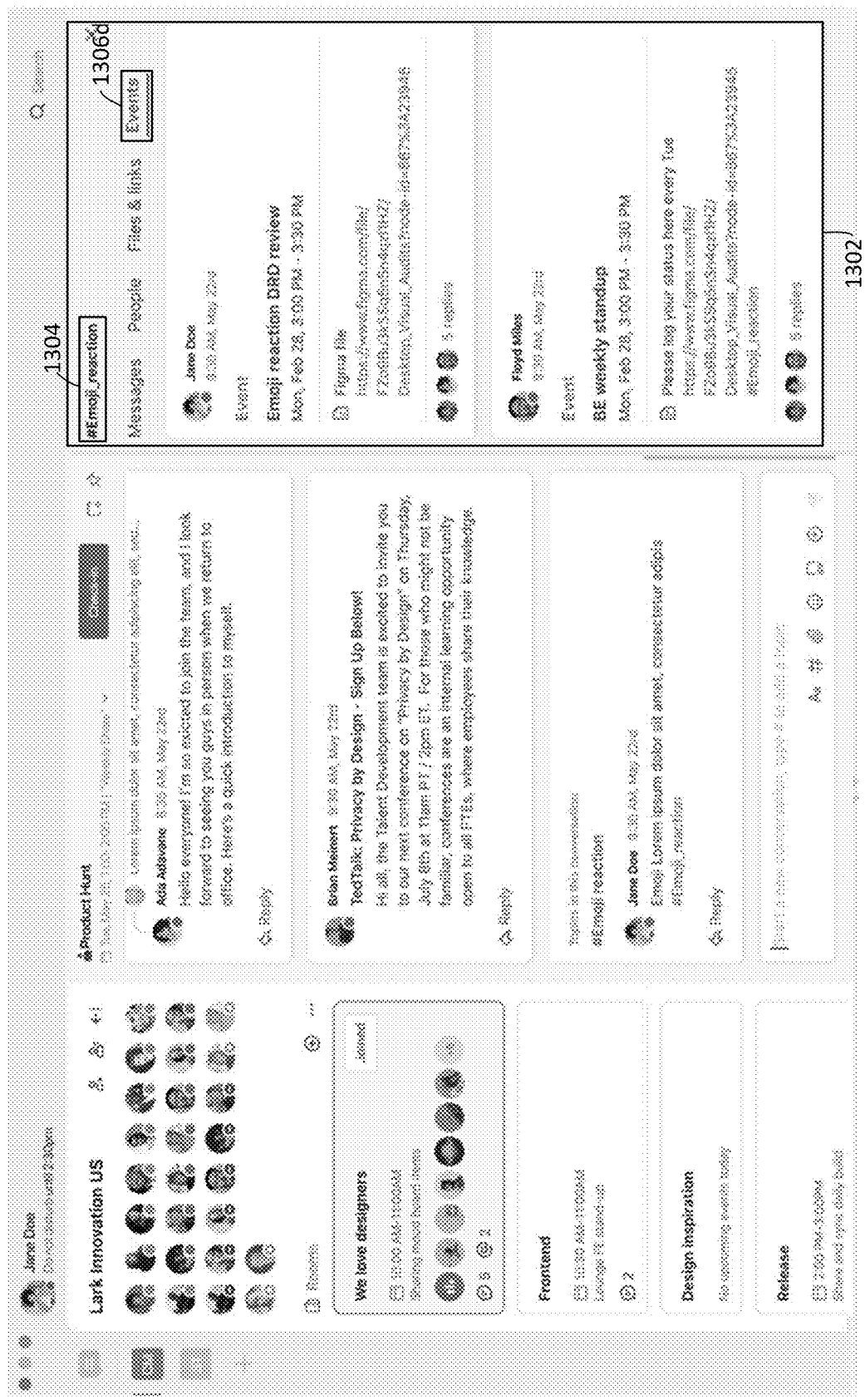
FIG. 16 shows another example user interface for facilitating communication in accordance with the present disclosure.

If the user wants to view the data associated with the topic 1304 that is "event" data, the user may select the tab 1306*d*. FIG. 16 shows an example UI 1600 displaying the tab 1306*d* open in the panel 1302. If the tab 1306*d* is open in the panel 1302, "events" data associated with the topic 1304 may be displayed in the panel 1302. For example, a list of all scheduled events (past and/or upcoming) associated with the topic 1304 may be displayed in the panel 1302 when the tab 1306*d* is open. A time, duration, and/or location may be displayed for each event in the panel 1302. In this manner, the user viewing the UI 1600 may be able to see all events that are associated with the topic 1304 in a central location. This may make it easier and more efficient for the user to find an event that he or she is looking for.

In embodiments, a particular user may have access to all of the plurality of virtual rooms. If a particular user has access to all of the plurality of virtual rooms, then the communication service 112 may not restrict which data is shown in the panel 1302. In other embodiments, a particular user may not have access to all of the plurality of virtual rooms. For example, one or more of the virtual rooms may be private so that only a subset of users of the communication service 112 can access them. If a particular user cannot access a virtual room, then any data associated with that virtual room may not be displayed in the panel 1302. For example, any messages, events, threads, bubble chats, etc. associated with that virtual room will not be displayed in the panel 1302 in any of the tabs 1306*a-d*.

It should be appreciated that the communication service 112 in FIG. 2 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

FIG. 4 illustrates an example process 400 for facilitating communication, which may be performed by a communication service (e.g., communication service 112) in accordance with the present disclosure. For example, the process 400 may be utilized to facilitate collaboration in a work environment. Although depicted as a sequence of operations in FIG. 4, those of ordinary skill in the art will appreciate that various embodiments may add, remove, reorder, or modify the depicted operations.

As described above, the communication service may be configured to aggregate data shared by users via message threads and/or virtual rooms. For example, the communication service may aggregate, in an aggregation database, data shared by users via message threads and/or virtual rooms. At 402, data shared by at least a subset of a plurality of users via a plurality of message threads and a plurality of virtual rooms in the workspace may be aggregated. The data may include data indicative of messages shared by one or more of the users in any and/or all of the message threads. The data may additionally or alternatively include data indicative of messages shared by one or more of the users in any and/or all of the chats in the virtual rooms. The data may additionally include events scheduled by users in any of all of the virtual rooms.

The communication service may categorize the aggregated data into a plurality of categories based on determining relatedness of the data. For example, the communication service may categorize the data related to a first virtual room into a plurality of categories based on determining relatedness of the data. The first virtual room may be any of the virtual rooms in the workspace. At 404, the data may be categorized into a plurality of categories based on determining relatedness of the data. For example, the communication service may categorize the data stored in the aggregation database into the plurality of categories based on a plurality of topics associated with the data. As described above, some or all of the messages shared in asynchronous text chats or message threads may be associated with one or more topics. Likewise, events may be associated with one or more topics. The topic(s) associated with a particular message or event may indicate, for example, a theme, subject matter, or category associated with that message or event. Thus, two messages that are associated with the same topic are related and/or are likely to be related. Likewise, two events that are associated with the same topic are related and/or are likely to be related. Similarly, an event and a message that are associated with the same topic are related and/or are likely to be related. Thus, the communication service may categorize all messages and/or events that are associated with a first topic together in one cluster (group, category, etc.), all messages and/or events that are associated with a second topic together in a second cluster, and so on.

The communication service may classify the data categorized into any and/or all categories based on a plurality of types of the data associated with the category. At 406, data associated with any category among the plurality of categories may be classified based on a plurality of types of the data associated with the category. For example, any one item of data categorized into a particular category may be associated with one or more of the following classifications (e.g., types of data): messages, people, files and/or links, and events. Such types of data are intended to be exemplary only, and in embodiments, the categorized data may be classified into any other suitable type of data.

The communication service may cause one or more of the plurality of types of the data (e.g., one of the classifications) associated with any category to be displayed on computing devices associated with the users. At 408, display of one of the plurality of types of the data associated with the category may be caused on a first computing device associated with a first user among the plurality of users. For example, the communication service may cause one of the plurality of types of the data (e.g., one of the classifications) associated with a particular category to be displayed on a computing device associated with a user based on receiving an indication that a user selected that category.

Figure 5:
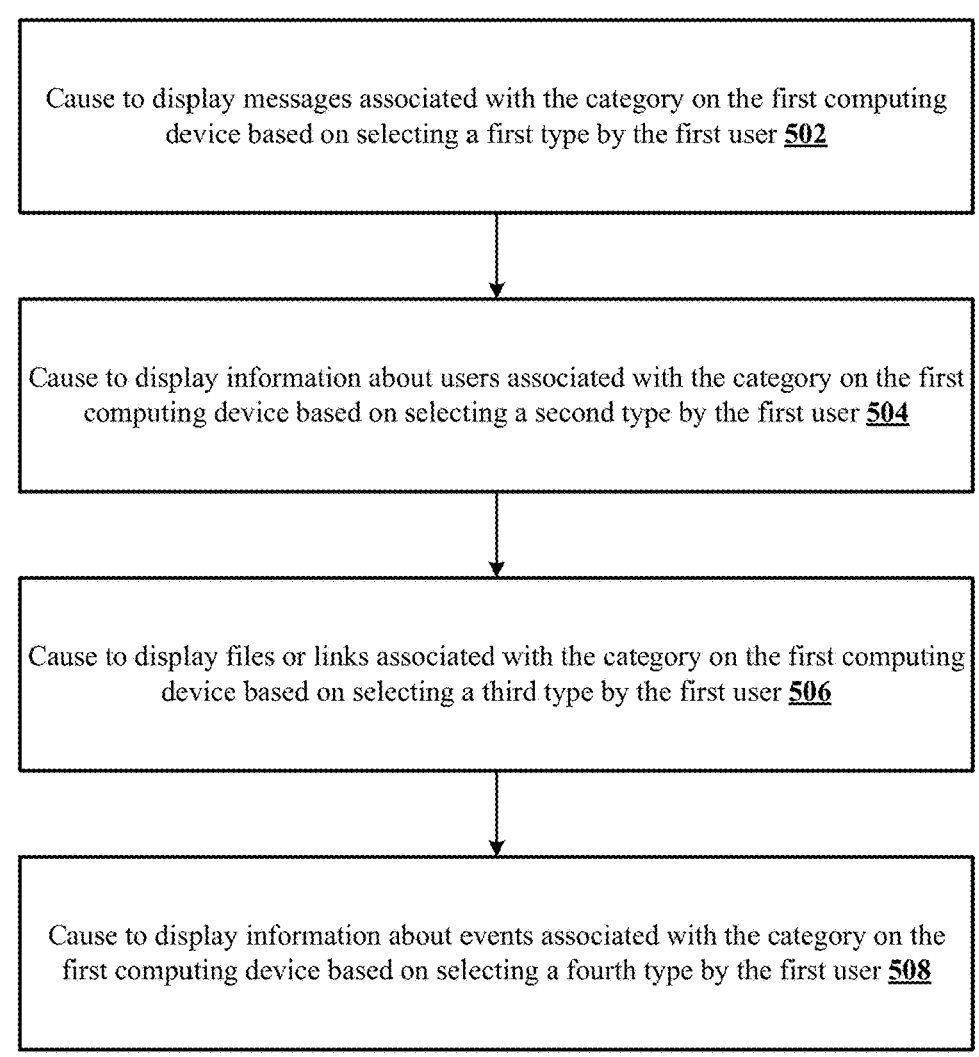
FIG. 5 shows an example process for facilitating communication, which may be performed by a communication system in accordance with the present disclosure.

FIG. 5 illustrates an example process 500 for facilitating communication, which may be performed by a communication service (e.g., communication service 112) in accordance with the present disclosure. For example, the process 500 may be utilized to facilitate collaboration in a work environment. Although depicted as a sequence of operations in FIG. 5, those of ordinary skill in the art will appreciate that various embodiments may add, remove, reorder, or modify the depicted operations.

As described above, the communication service may cause one or more of the plurality of types of the data (e.g., one of the classifications) associated with any category to be displayed on computing devices associated with the users. For example, the communication service may cause one of the plurality of types of the data (e.g., one of the classifications) associated with a particular category to be displayed on a computing device associated with a user based on receiving an indication that a user selected that category. At 502, display of messages associated with the category may be caused on a first computing device based on selecting a first type by the first user. For example, display of "message" data associated with the topic may be caused. The message data may be associated with all messages exchanged via the communication service that are associated with the category. In this manner, the first user may be able to see all messages associated with the category in a central location. This may make it easier and more efficient for the first user to find a message that he or she is looking for.

If the first user wants to instead view a different type of data associated with the category, the first user may select a different type of data. At 504, display of information about users associated with the category on the first computing device may be caused based on selecting a second type by the first user. For example, display of "people" data associated with the category may be caused. For example, a list of all users of the communication service that have exchanged a message associated with the category and/or scheduled an event associated with the category may be displayed. In this manner, the first user may be able to see all people (e.g., users) who are associated with the category in a central location. This may make it easier and more efficient for the first user to find a user that he or she is looking for.

If the first user wants to instead view a different type of data associated with the category, the first user may again select a different type of data. At 506, display of files or links associated with the category may be caused on the first computing device based on selecting a third type by the first user. For example, "files and/or links" data associated with the category may be displayed. For example, a list of all links and/or files associated with the category that users of the communication service have exchanged may be displayed. In this manner, the first user may be able to see links or files that are associated with the category in a central location. This may make it easier and more efficient for the first user to find a link or file that he or she is looking for.

If the first user wants to instead view a different type of data associated with the category, the first user may again select a different type of data. At 508, display of information about events associated with the category may be caused on the first computing device based on selecting a fourth type by the first user. For example, "events" data associated with the category may be displayed. For example, a list of all scheduled events (past and/or upcoming) associated with the category may be displayed. A time, duration, and/or location may be displayed for each event. In this manner, the first user may be able to see all events that are associated with the category in a central location. This may make it easier and more efficient for the first user to find an event that he or she is looking for.

FIG. 6 illustrates an example process 600 for facilitating communication, which may be performed by a communication service (e.g., communication service 112) in accordance with the present disclosure. For example, the process 600 may be utilized to facilitate collaboration in a work environment. Although depicted as a sequence of operations in FIG. 6, those of ordinary skill in the art will appreciate that various embodiments may add, remove, reorder, or modify the depicted operations.

As described above, the communication service may be configured to aggregate data shared by users via message threads and/or virtual rooms. For example, the communication service may aggregate, in an aggregation database, data shared by users via message threads and/or virtual rooms. At 602, data shared by at least a subset of a plurality of users via a plurality of message threads and a plurality of virtual rooms in the workspace may be aggregated. The data may include data indicative of messages shared by one or more of the users in any and/or all of the message threads. The data may additionally or alternatively include data indicative of messages shared by one or more of the users in any and/or all of the chats in the virtual rooms. The data may additionally include events scheduled by users in any of all of the virtual rooms.

As described above, the communication service may retroactively assign topics to previous and/or existing messages that were sent to a message thread and/or to an asynchronous chat. Such previous and/or existing messages may have been sent without being associated with a topic. In other embodiments, a previous and/or existing message may have been sent with one or more associated topics, and the communication service may retroactively assign additional topics to the message. At 604, a plurality of topics may be automatically generated based on at least a subset of the data and predetermined rules. For example, the communication service may retroactively assign a topic to a message based on one or more of a title of message thread or an asynchronous chat that the message belongs to, a user that sent the message, the actual text of the message, etc.

At 606, the data may be categorized into a plurality of categories based on determining relatedness of the data. For example, the communication service may categorize the data stored in the aggregation database into the plurality of categories based on a plurality of topics associated with the data. As described above, some or all of the messages shared in an asynchronous text chat and/or one or more message threads, may be associated with one or more topics. Likewise, events may be associated with one or more topics. The topic(s) associated with a particular message or event may indicate, for example, a theme, subject matter, or category associated with that message or event. Thus, two messages that are associated with the same topic are related and/or are likely to be related. Likewise, two events that are associated with the same topic are related and/or are likely to be related. Similarly, an event and a message that are associated with the same topic are related and/or are likely to be related. Thus, the communication service may categorize all messages and/or events that are associated with a first topic together in one cluster (group, category, etc.), all messages and/or events that are associated with a second topic together in a second cluster, and so on.

The communication service may classify the data categorized into any and/or all categories based on a plurality of types of the data associated with the category. At 608, data associated with any category among the plurality of categories may be classified based on a plurality of types of the data associated with the category. For example, any one item of data categorized into a particular category may be associated with one or more of the following classifications (e.g., types of data): messages, people, files and/or links, and events. Such types of data are intended to be exemplary only, and in embodiments, the categorized data may be classified into any other suitable type of data.

A first user may be in a virtual room, see a category of interest in a chat or message thread in the virtual room, and click on the topic. Likewise, the user may see a category of interest in a scheduled event and click on the topic. The user may select the topic for a variety of reasons, such as if the user wants to see, in one central location, all data related to the topic that has been exchanged via the communication service. If the user selects the topic, a panel may be displayed on a user interface of a computing device associated with the user. At 610, display of an interface associated with the category may be caused based on a selection of the category by a first user among the plurality of users. The interface may comprise information about the plurality of types of the data associated with the category. For example, the panel may be configured to display all types of data that have been categorized into the category associated with the topic.

The communication service may cause one or more of the plurality of types of the data (e.g., one of the classifications) associated with any category to be displayed on computing devices associated with the users. At 612, display of one of the plurality of types of the data associated with the category may be caused on a first computing device associated with a first user among the plurality of users. For example, the communication service may cause one of the plurality of types of the data (e.g., one of the classifications) associated with a particular category to be displayed on a computing device associated with a user based on receiving an indication that a user selected that type of data.

Figure 7:
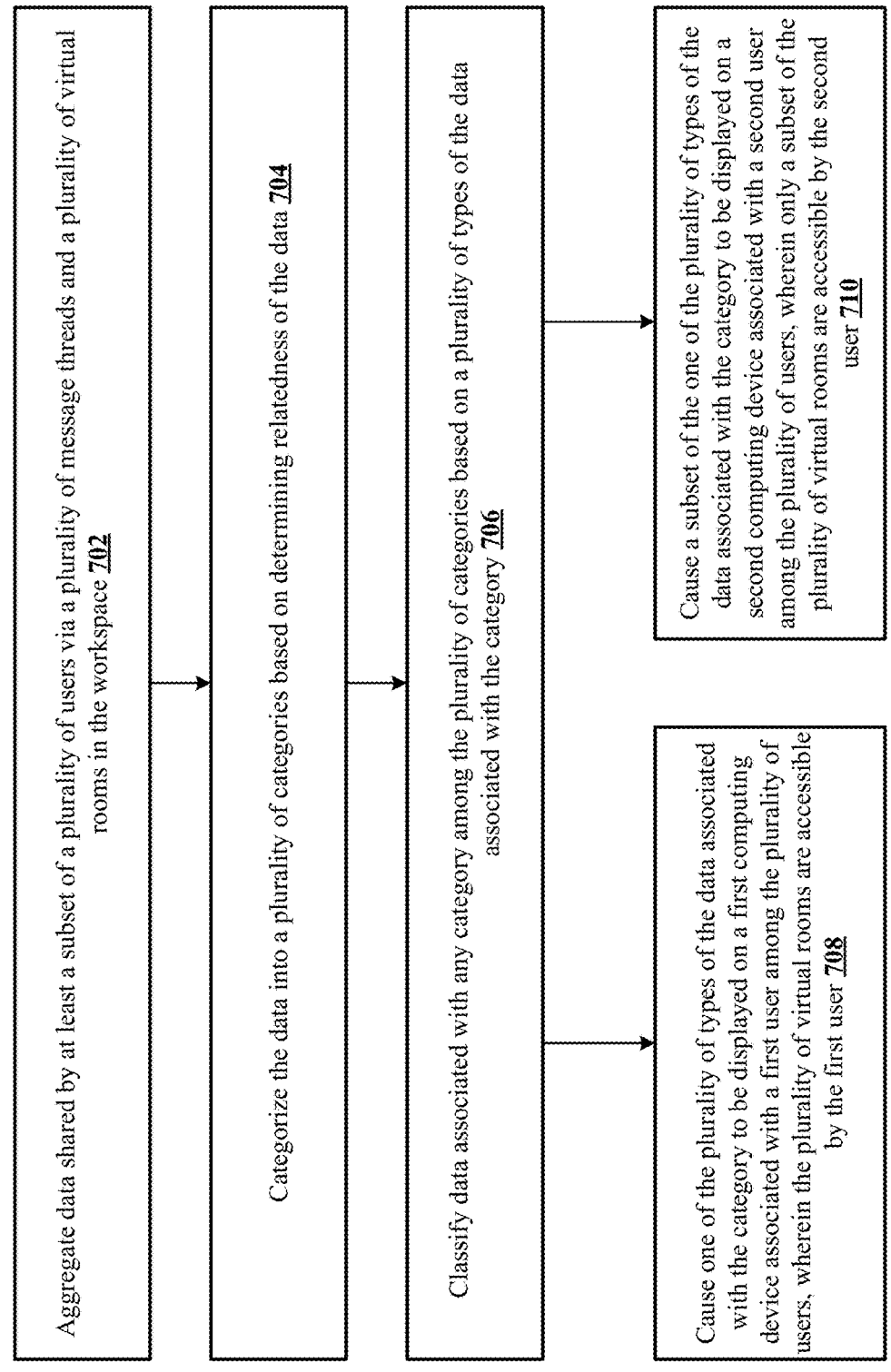
FIG. 7 shows an example process for facilitating communication, which may be performed by a communication system in accordance with the present disclosure.

FIG. 7 illustrates an example process 700 for facilitating communication, which may be performed by a communication service (e.g., communication service 112) in accordance with the present disclosure. For example, the process 700 may be utilized to facilitate collaboration in a work environment. Although depicted as a sequence of operations in FIG. 7, those of ordinary skill in the art will appreciate that various embodiments may add, remove, reorder, or modify the depicted operations.

As described above, the communication service may be configured to aggregate data shared by users via message threads and/or virtual rooms. For example, the communication service may aggregate, in an aggregation database, data shared by users via message threads and/or virtual rooms. At 702, data shared by at least a subset of a plurality of users via a plurality of message threads and a plurality of virtual rooms in the workspace may be aggregated. The data may include data indicative of messages shared by one or more of the users in any and/or all of the message threads. The data may additionally or alternatively include data indicative of messages shared by one or more of the users in any and/or all of the chats in the virtual rooms. The data may additionally include events scheduled by users in any of all of the virtual rooms.

The communication service may categorize the aggregated data into a plurality of categories based on determining relatedness of the data. At 704, the data may be categorized into a plurality of categories based on determining relatedness of the data. For example, the communication service may categorize the data stored in the aggregation database into the plurality of categories based on a plurality of topics associated with the data. As described above, some or all of the messages shared in asynchronous text chats or message threads may be associated with one or more topics. Likewise, events may be associated with one or more topics. The topic(s) associated with a particular message or event may indicate, for example, a theme, subject matter, or category associated with that message or event. Thus, two messages that are associated with the same topic are related and/or are likely to be related. Likewise, two events that are associated with the same topic are related and/or are likely to be related. Similarly, an event and a message that are associated with the same topic are related and/or are likely to be related. Thus, the communication service may categorize all messages and/or events that are associated with a first topic together in one cluster (group, category, etc.), all messages and/or events that are associated with a second topic together in a second cluster, and so on.

The communication service may classify the data categorized into any and/or all categories based on a plurality of types of the data associated with the category. At 706, data associated with any category among the plurality of categories may be classified based on a plurality of types of the data associated with the category. For example, any one item of data categorized into a particular category may be associated with one or more of the following classifications (e.g., types of data): messages, people, files and/or links, and events. Such types of data are intended to be exemplary only, and in embodiments, the categorized data may be classified into any other suitable type of data.

A first user may have access to all of the plurality of virtual rooms. If the first user has access to all of the plurality of virtual rooms, then the communication service may not restrict which data is shown to the first user. The communication service may cause one or more of the plurality of types of the data (e.g., one of the classifications) associated with any category to be displayed on computing devices associated with the users. At 708, display of one of the plurality of types of the data associated with the category may be caused on a first computing device associated with a first user among the plurality of users. For example, the communication service may cause one of the plurality of types of the data (e.g., one of the classifications) associated with a particular category to be displayed on a computing device associated with a user based on receiving an indication that a user selected that category. The first user may have access to all of the plurality of virtual rooms.

A second user may not have access to all of the plurality of virtual rooms. For example, one or more of the virtual rooms may be private so that only a subset of users of the communication service can access them. If the second user cannot access a virtual room, then any data associated with that virtual room may not be displayed to the second user. For example, any messages, events, threads, bubble chats, etc. associated with that virtual room will not be displayed to the second user. At 710, display of a subset of the one of the plurality of types of the data associated with the category may be caused on a second computing device associated with a second user among the plurality of users. Only a subset of the plurality of virtual rooms may be accessible by the second user.

Figure 17:
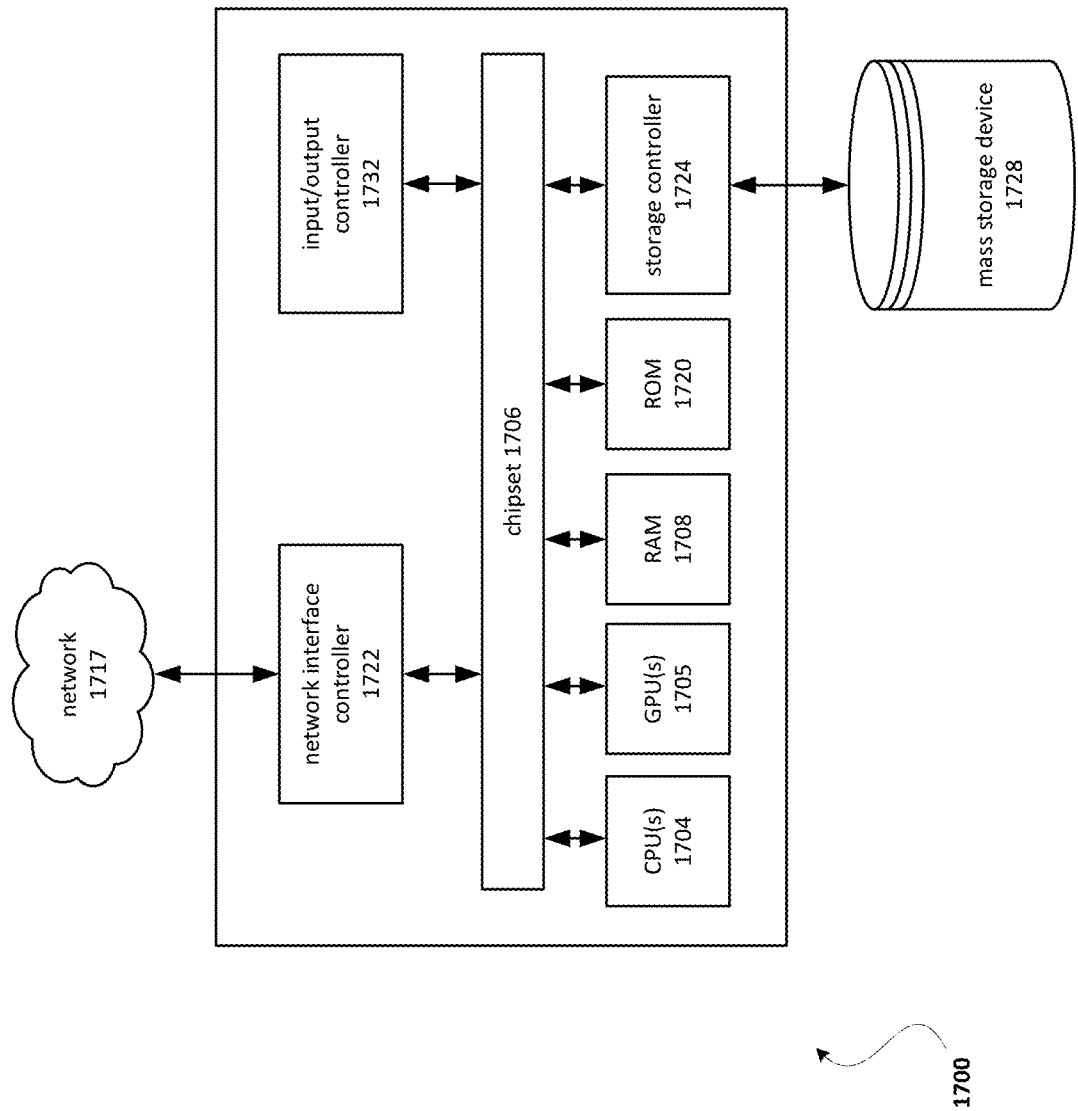
FIG. 17 shows an example computing device which may be used to perform any of the techniques disclosed herein.

FIG. 17 illustrates a computing device that may be used in various aspects, such as the services, networks, modules, and/or devices depicted in FIG. 1. With regard to the example architecture of FIG. 1, the cloud network 102, user device 104*a*-*d* (collectively user device 104), communication service 112, database(s) 113, and/or network 120 may each be implemented by one or more instance of a computing device 1700 of FIG. 17. Likewise, with regard to the example architecture of FIG. 2, the authentication service 226, the management service 223 (and any of its components), the chat service 222, and/or the video conference service 253 may each be implemented by one or more instance of a computing device 1700 of FIG. 17.

The computer architecture shown in FIG. 17 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1700 may include a baseboard, or "motherboard," which is a printed circuit board to which a multitude of components or devices may be connected by way of a system bus or other electrical communication paths. One or more central processing units (CPUs) 1704 may operate in conjunction with a chipset 1706. The CPU(s) 1704 may be standard programmable processors that perform arithmetic and logical operations necessary for the operation of the computing device 1700.

The CPU(s) 1704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1704 may be augmented with or replaced by other processing units, such as GPU(s) 1705. The GPU(s) 1705 may comprise processing units specialized for but not necessarily limited to highly parallel computations, such as graphics and other visualization-related processing.

A chipset 1706 may provide an interface between the CPU(s) 1704 and the remainder of the components and devices on the baseboard. The chipset 1706 may provide an interface to a random-access memory (RAM) 1708 used as the main memory in the computing device 1700. The chipset 1706 may further provide an interface to a computer-readable storage medium, such as a read-only memory (ROM) 1720 or non-volatile RAM (NVRAM) (not shown), for storing basic routines that may help to start up the computing device 1700 and to transfer information between the various components and devices. ROM 1720 or NVRAM may also store other software components necessary for the operation of the computing device 1700 in accordance with the aspects described herein.

The computing device 1700 may operate in a networked environment using logical connections to remote computing nodes and computer systems through local area network (LAN). The chipset 1706 may include functionality for providing network connectivity through a network interface controller (NIC) 1722, such as a gigabit Ethernet adapter. A NIC 1722 may be capable of connecting the computing device 1700 to other computing nodes over a network 1716. It should be appreciated that multiple NICs 1722 may be present in the computing device 1700, connecting the computing device to other types of networks and remote computer systems.

The computing device 1700 may be connected to a mass storage device 1728 that provides non-volatile storage for the computer. The mass storage device 1728 may store system programs, application programs, other program modules, and data, which have been described in greater detail herein. The mass storage device 1728 may be connected to the computing device 1700 through a storage controller 1724 connected to the chipset 1706. The mass storage device 1728 may consist of one or more physical storage units. The mass storage device 1728 may comprise a management component 1710. A storage controller 1724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1700 may store data on the mass storage device 1728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1728 is characterized as primary or secondary storage and the like.

For example, the computing device 1700 may store information to the mass storage device 1728 by issuing instructions through a storage controller 1724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 may further read information from the mass storage device 1728 by detecting the physical states or characteristics of one or more particular locations within the physical storage units.

In addition to the mass storage device 1728 described above, the computing device 1700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1728 depicted in FIG. 17, may store an operating system utilized to control the operation of the computing device 1700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1728 may store other system or application programs and data utilized by the computing device 1700.

The mass storage device 1728 or other computer-readable storage media may also be encoded with computer-executable instructions, which, when loaded into the computing device 1700, transforms the computing device from a general-purpose computing system into a special-purpose computer capable of implementing the aspects described herein. These computer-executable instructions transform the computing device 1700 by specifying how the CPU(s) 1704 transition between states, as described above. The computing device 1700 may have access to computer-readable storage media storing computer-executable instructions, which, when executed by the computing device 1700, may perform the methods described herein.

A computing device, such as the computing device 1700 depicted in FIG. 17, may also include an input/output controller 1732 for receiving and processing input from a number of input devices, such as a keyboard, a mouse, a touchpad, a touch screen, an electronic stylus, or other type of input device. Similarly, an input/output controller 1732 may provide output to a display, such as a computer monitor, a flat-panel display, a digital projector, a printer, a plotter, or other type of output device. It will be appreciated that the computing device 1700 may not include all of the components shown in FIG. 17, may include other components that are not explicitly shown in FIG. 17, or may utilize an architecture completely different than that shown in FIG. 17.

As described herein, a computing device may be a physical computing device, such as the computing device 1700 of FIG. 17. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of facilitating a collaborative work environment, comprising:
    aggregating data selected based on being shared by a subset of users among a plurality of users, wherein the subset of users shared the data via a plurality of message threads and a plurality of virtual rooms in the collaborative work environment;
    categorizing the aggregated data into a plurality of categories based on determining topic relatedness of the data shared via the plurality of message threads and the plurality of virtual rooms, wherein the plurality of categories corresponds to a plurality of same topics;
    classifying the categorized data, the classification being based on a plurality of types of the data, wherein the plurality of types of the data comprise a first type of messages, a second type of people, a third type of files or links, and a fourth type of events;
    causing to display a user interface on a first computing device associated with a first user among the plurality of users in response to receiving a selection of one topic of the plurality of topics, wherein the user interface is configured to display the plurality of types of the data on the user interface; and
    causing to be displayed on the first computing device a first subset of data classified based on one type among the plurality of types of the data in response to receiving from the first user an input of selecting the one type, wherein the first subset of data is limited such that data associated with a first subset of the plurality of virtual rooms inaccessible by the first user is not displayed; and
    causing to be displayed on a second computing device a second subset of data classified based on the one type, the second computing device associated with a second user among the plurality of users, wherein the second subset of data is limited such that data associated with a second subset of the plurality of virtual rooms inaccessible by the second user is not displayed.

2. The method of claim 1, wherein each of the plurality of virtual rooms is configured to enable real-time communications and data sharing among users in a same virtual room, and wherein the plurality of message threads comprise data shared among users from different virtual rooms in the collaborative environment.

3. The method of claim 1, further comprising:
    causing to display messages associated with the category on the first computing device based on selecting the first type by the first user;
    causing to display information about users associated with the category on the first computing device based on selecting the second type by the first user;
    causing to display files or links associated with the category on the first computing device based on selecting the third type by the first user; or
    causing to display information about events associated with category on the first computing device based on selecting the fourth type by the first user.

4. The method of claim 1, wherein the plurality of topics are generated based on user input, wherein the user input comprises a predetermined character.

5. The method of claim 1, further comprising:
    automatically generating the plurality of topics based on at least a subset of the data and predetermined rules.

6. The method of claim 1, wherein the plurality of virtual rooms are accessible by the first user.

7. The method of claim 1, further comprising:
    causing to display a panel associated with the category based on a selection of the category by the first user, wherein the panel comprises information about the plurality of types of the data associated with the category.

8. The method of claim 1, further comprising:
    categorizing data associated with a first virtual room into one or more categories based on determining topic relatedness of the data associated with the first virtual room, wherein the first virtual room is any of the plurality of virtual rooms in the collaborative work environment.

9. The method of claim 1, further comprising:
    categorizing all messages in a first message thread into one of the plurality of categories based on a topic associated with a first message in the first message thread, wherein the first message thread is among the plurality of message threads, and wherein the first message is any of the messages in the first message thread.

10. A system of facilitating a collaborative work environment, comprising:
    at least one memory; and
    at least one processor in communication with the at least one memory, wherein instructions stored in the at least one memory upon execution by the at least one processor cause the system to perform operations comprising:
    aggregating data selected based on a being shared by a subset of users among a plurality of users, wherein the subset of users shared the data via a plurality of message threads and a plurality of virtual rooms in the collaborative work environment;
    categorizing the aggregated data into a plurality of categories based on determining topic relatedness of the data shared via the plurality of message threads and the plurality of virtual rooms, wherein the plurality of categories corresponds to a plurality of same topics;
    classifying the categorized data associated with any one category related to a same topic among the plurality of same topics, the classification being based on a plurality of types of the data associated with the same topic, wherein the plurality of types of the data associated with the same topic comprise a first type of messages, a second type of people, a third type of files or links, and a fourth type of events;
    causing to display a user interface on a first computing device associated with a first user among the plurality of users in response to receiving a selection of one topic of the plurality of topics, wherein the user interface is configured to display the plurality of types of the data on the user interface; and
    causing to be displayed on the first computing device a first subset of data classified based on one type among the plurality of types of the in response to receiving from the first user an input of selecting the one type, wherein the first subset of data is limited such that data associated with a first subset of the plurality of virtual rooms inaccessible by the first user is not displayed; and
    causing to be displayed on a second computing device a second subset of data classified based on the one type, the second computing device associated with a second user among the plurality of users, wherein the second subset of data is limited such that data associated with a second subset of the plurality of virtual rooms inaccessible by the second user is not displayed.

11. The system of claim 10, wherein each of the plurality of virtual rooms is configured to enable real-time communications and data sharing among users in a same virtual room, and wherein the plurality of message threads comprise data shared among users from different virtual rooms in the collaborative environment.

12. The system of claim 10, the operations further comprising:
causing to display messages associated with the category on the first computing device based on selecting the first type by the first user;
causing to display information about users associated with the category on the first computing device based on selecting the second type by the first user;
causing to display files or links associated with the category on the first computing device based on selecting the third type by the first user; or
causing to display information about events associated with category on the first computing device based on selecting the fourth type by the first user.

13. The system of claim 10, the operations further comprising:
automatically generating the plurality of topics based on at least a subset of the data and predetermined rules.

14. The system of claim 10, the operations further comprising:
causing a subset of the one of the plurality of types of the data associated with the category to be displayed on a second computing device associated with a second user among the plurality of users, wherein only a subset of the plurality of virtual rooms are accessible by the second user.

15. A non-transitory computer-readable storage medium, storing computer-readable instructions that upon execution by at least one processor cause the at least one processor to perform operations comprising:
aggregating data selected based on a being shared by a subset of users among a plurality of users, wherein the subset of users shared the data via a plurality of message threads and a plurality of virtual rooms in a collaborative work environment;
categorizing the aggregated data into a plurality of categories based on determining topic relatedness of the data shared via the plurality of message threads and the plurality of virtual rooms, wherein the plurality of categories corresponds to a plurality of same topics;
classifying the categorized data associated with any one category related to a same topic among the plurality of same topics, the classification being based on a plurality of types of the data associated with the same topic, wherein the plurality of types of the data associated with the same topic comprise a first type of messages, a second type of people, a third type of files or links, and a fourth type of events;
causing to display a user interface on a first computing device associated with a first user among the plurality of users in response to receiving a selection of one topic of the plurality of topics, wherein the user interface is configured to display the plurality of types of the data on the user interface; and
causing to be displayed on the first computing device a first subset of data classified based on one type among the plurality of types of the data in response to receiving from the first user an input of selecting the one type, wherein the first subset of data is limited such that data associated with a first subset of the plurality of virtual rooms inaccessible by the first user is not displayed; and
causing to be displayed on a second computing device a second subset of data classified based on the one type, the second computing device associated with a second user among the plurality of users, wherein the second subset of data is limited such that data associated with a second subset of the plurality of virtual rooms inaccessible by the second user is not displayed.

16. The non-transitory computer-readable storage medium of claim 15, wherein each of the plurality of virtual rooms is configured to enable real-time communications and data sharing among users in a same virtual room, and wherein the plurality of message threads comprise data shared among users from different virtual rooms in the collaborative environment.

17. The non-transitory computer-readable storage medium of claim 15, the operations further comprising:
causing to display messages associated with the category on the first computing device based on selecting the first type by the first user;
causing to display information about users associated with the category on the first computing device based on selecting the second type by the first user;
causing to display files or links associated with the category on the first computing device based on selecting the third type by the first user; or
causing to display information about events associated with category on the first computing device based on selecting the fourth type by the first user.

18. The method of claim 1, wherein the user interface comprises a plurality of selectable interface elements corresponding to the plurality of types of the data associated with the same topic.

19. The method of claim 18, further comprising:
causing to display all messages associated with the same topic in an area of the user interface in response to selecting a first interface element among the plurality of selectable interface elements;
causing to display all users associated with the same topic in the area of the user interface in response to selecting a second interface element among the plurality of selectable interface elements;
causing to display a list of all files and links associated with the same topic in the area of the user interface in response to selecting a third interface element among the plurality of selectable interface elements; and
causing to display a list of all scheduled events associated with the same topic in the area of the user interface in response to selecting a fourth interface element among the plurality of selectable interface elements.

* * * * *